US006876372B2

(12) United States Patent
Nagafusa et al.

(10) Patent No.: US 6,876,372 B2
(45) Date of Patent: Apr. 5, 2005

(54) IMAGE FORMING APPARATUS

(75) Inventors: Yoshiyuki Nagafusa, Mie-ken (JP); Tatsuji Kawashima, Mie-ken (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 10/368,957

(22) Filed: Feb. 19, 2003

(65) Prior Publication Data

US 2003/0218671 A1 Nov. 27, 2003

(30) Foreign Application Priority Data

| Feb. 20, 2002 | (JP) | ................................. 2002-44040 |
| Feb. 20, 2002 | (JP) | ................................. 2002-044041 |
| May 29, 2002 | (JP) | ................................. 2002-156248 |

(51) Int. Cl.⁷ ............................................. B41J 2/435
(52) U.S. Cl. ........................ 347/130; 347/237; 347/238
(58) Field of Search ............................. 347/118, 130, 347/238, 132, 237, 247, 233, 234; 399/58, 177, 220

(56) References Cited

U.S. PATENT DOCUMENTS

| 4,700,367 | A | | 10/1987 | Kawazoe et al. | |
| 5,600,363 | A | * | 2/1997 | Anzaki et al. | ............... 347/237 |
| 5,671,002 | A | * | 9/1997 | Murano | ....................... 347/237 |
| 6,166,757 | A | * | 12/2000 | Murano | ....................... 347/240 |
| 6,215,511 | B1 | * | 4/2001 | Asako et al. | ................ 347/234 |
| 6,633,322 | B2 | * | 10/2003 | Sakai et al. | .................. 347/233 |
| 6,636,252 | B2 | * | 10/2003 | Hiraoka | ....................... 347/238 |

FOREIGN PATENT DOCUMENTS

JP     H6-14610/1994     2/1994

* cited by examiner

Primary Examiner—Andrew H. Hirshfeld
Assistant Examiner—Leo T. Hinze
(74) Attorney, Agent, or Firm—Schulte Roth & Zabel, LLP; Joel E. Lutzker; John C. Garces

(57) ABSTRACT

In order to expose a required exposed line for which an exposing deviation caused by a fixing accuracy of an exposing head is corrected, when exposing images by dynamic lighting control, an image forming apparatus comprises a exposing head 24 having a plurality of arrayed illuminants aligned in the main scanning direction wherein, when an image bearing body moving in the auxiliary direction at a predetermined scanning speed is exposed to form an image by controlling dynamically to light arrayed illuminants according to image data, a detector for a position of a print head 17 detects a deviation from a predetermined standard fixing point generating a deviating position detecting signal. A memory control circuit 14 selects as an exposing data from image data of the k−1 (k is an integer greater than 1) precedent line to image data of the current line based on a correcting value determined in accordance with a deviation denoted by the position-detecting signal. The arrayed illuminants are dynamically controlled to light whereby an exposing head position detecting device can detect a deviation from the standard fixing position according to the distribution of the received light from light emitting elements provided to each of the exposing head.

15 Claims, 19 Drawing Sheets

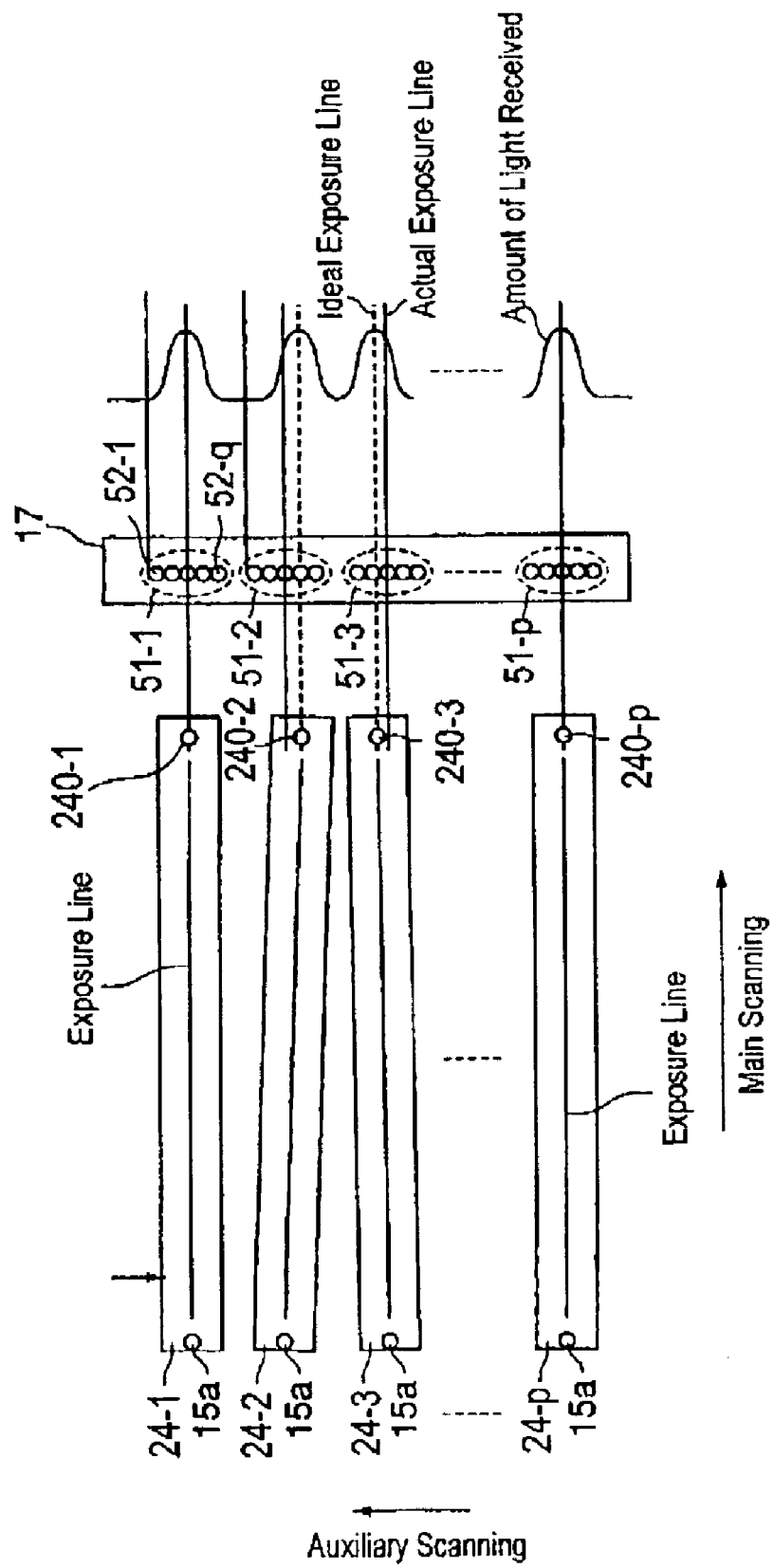

FIG.8
FIG.9
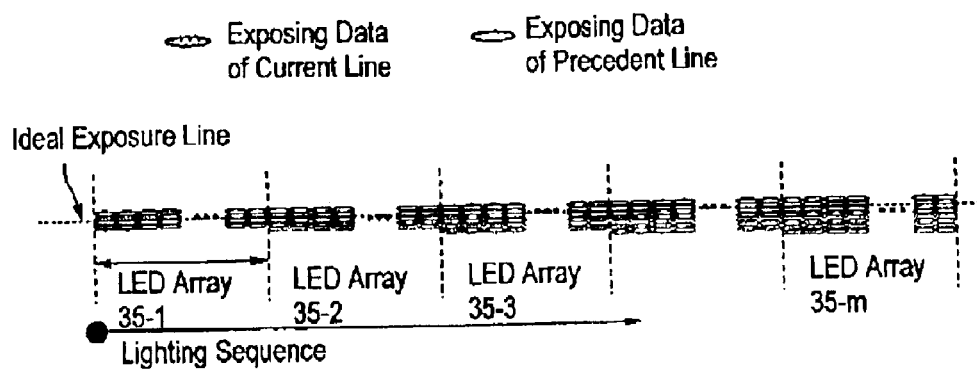
FIG.10
| Number of Scanning(s) | LED Number Beginning to correct | δ x (LED Number -1) | Scanning Times / Scanning Density |
|---|---|---|---|
| 1 | 13 | 0.2700 | 0.25 |
| 2 | 23 | 0.5175 | 0.50 |
| 3 | 35 | 0.7650 | 0.75 |
| 4 | — | — | — |

A

IMAGE FORMING APPARATUS

BACKGROUND OF THE INVENTION

1. Field of the Invention

The present invention relates to an image forming apparatus having a plurality of arrayed illuminants as an exposing device wherein the plurality of arrayed illuminants are controlled dynamically for lighting so as to form an image on a latent image bearing body (e.g. a photosensitive body drum) by exposing an image.

2. Description of the Related Art

An image forming apparatus which forms an electrostatic latent image corresponding to an exposed image focused on the generating line of a photosensitive body (an image bearing body) by controlling dynamically for lighting a plurality of arrayed illuminants aligned along a main scanning direction according to an image data at a n-bit unit (n is an integer) or a main scanning line unit is publicly known.

For example, arrayed illuminants are arrayed LEDs having a plurality of LED elements. An image forming apparatus using such arrayed LEDs is called an LED printer wherein an exposing head comprises a plurality of arrayed LEDs. As shown in FIG. 22, an LED print head 12 is disposed along a main scanning direction and a photosensitive body drum 11 is moved in an auxiliary scanning direction at a linear speed (a printing speed) of S mm/s while a dynamic lighting control where each of arrayed LEDs is lighted sequentially is performed so as to form an electrostatic latent image on the photosensitive body drum 11.

Meanwhile, according to the dynamic lighting control stated above, when time-shared exposures are done to the photosensitive body drum 11, which is rotating at a printing speed S, an image is exposed obliquely at an arrayed LEDs unit to the aligning direction of arrayed LEDs.

M (m is an integer greater than 1) sets of arrayed LEDs (arrayed LEDs 35-1~35-m) are provided and these arrayed LEDs 35-1~35-m are disposed in a main scanning direction as shown in FIG. 23. As the photosensitive body 11 is rotated in the bold arrow direction, if sets of arrayed LEDs is controlled to be lighted in the sequence of 35-1~35m, the drum 11 is rotated at the time when the 35-m is lighted more than at the time when the 35-1 is lighted. As a result, an actual exposed line is drawn obliquely below an ideal exposed line shown in a dashed line in the figure. The problem is the exposed line becomes oblique so that it is difficult to obtain a desired image with the image forming apparatus in which sets of arrayed LEDs are controlled to be lighted in a time-shared manner by the dynamic lighting control. In order to overcome this drawback, Japanese patent publication JP1994-14610 discloses a circuit for controlling a pulse width, which corrects a deviance of the center position of printed pixels caused by rotation of the photosensitive body drum in an LED printer using a plurality of arrayed LEDs as a light source to improve printed image quality.

However, although, according to the prior art, a deviance of the center position of printed pixels caused by rotation of the photosensitive body drum is corrected, unless an exposing head is accurately fixed to the LED printer (a printer housing), a deviance is also generated between an ideal exposing line and an actual exposing line depending on an accuracy of fixing the print head. In other words, such drawback is not overcome as an image is obliquely exposed for arrayed LEDs unit. Therefore, an exposing head needs to be fixed with a precise accuracy at a predetermined position when it is fixed to an LED printer (a printer housing).

Further, in a tandem type LED printer, a plurality of exposing heads needs to be accurately fixed so as to be accurately parallel with each of the exposing heads or else exposing lines are out of alignment for each of the exposing heads even if the oblique exposure is corrected, which results in being incapable of forming a good image. Therefore, when an exposing head is fixed, the fixing accuracy is severely required. However, workload for mounting is up in order to fix the print heads accurately, increasing production cost.

Thus, a conventional LED printer has a problem that an oblique exposing is performed with respect to the aligning direction of arrayed LEDs, an actual exposing line deviating from an ideal exposing line due to the fixing accuracy of the LED print head. Parallelism of exposing lines between LED print heads is deteriorated unless each LED printhead is accurately fixed, so that it is difficult to obtain required images.

When light intensity is low for a printing speed or sensitivity of a photosensitive body drum is low in the aforementioned LED printer in which m (m is an integer greater than 1) sets of arrayed LEDs having n (n is a positive integer) elements of LED are disposed in a main scanning direction and the sets of arrayed LEDs are controlled to drive by dynamic lighting control, appropriate exposing energy (light intensity) can not be obtained.

Accordingly, m sets of arrayed LEDs are divided into a plurality of groups and each group is controlled by dynamic lighting control. For example, as shown in FIG. 19, m sets of arrayed LEDs are divided into tow groups (a first and a second group) each of which is provided with a dynamic lighting circuit and controlled by dynamic lighting control.

Referring to FIG. 19, an exposing head has m sets of arrayed LEDs from a first set to an m'th set. P sets of arrayed LEDs from a first set to a p'th set, i.e. 35-1~35-p, belong to a first group and m–p sets of arrayed LEDs from a (p+1)'th set to a m'th set, i.e. 35-(p+1)~35-m, belongs to a second group, where p is an integer greater than 1 and less than m, the first group contains the same sets of arrayed LEDs as the second group and each set of arrayed LEDs from the first to the m'th has n elements 12-1~12-n of LEDs.

The p sets of arrayed LEDs from the first set to the p'th set, i.e. 35-1~35-p, are driven by a first LED driver circuit and the m–p sets of arrayed LEDs from the (p+1)'th set to the m'th set, i.e. 35-(p+1)~35-m, are driven by a second LED driver circuit. Thus, the p sets of arrayed LEDs from the first set to the p'th set, i.e. 35-1~35-p, are connected to a first anode driver 13 and a first cathode driver 14 and the m–p sets of arrayed LEDs from the (p+1)'th set to the m'th set, i.e. 35-(p+1)~35-m, are connected to a second anode driver 15 and a second cathode driver 16. The p sets of arrayed LEDs from the first set to the p'th set, i.e. 35-1~35-p, are driven by the first anode driver 13 and the first cathode driver 14 based on an image data and the m–p sets of arrayed LEDs from the (p+1)'th set to the m'th set, i.e. 35-(p+1)~35-m, are driven by the second anode driver 15 and the second cathode driver 16 based on an image data.

The first anode driver 13 has n output terminals from a first to an n'th terminal and each of the output terminals from the first to the n'th is connected to each of anodes of the LED elements of 12-1~12-n. While, the first cathode driver 14 has p output terminals from a first to p'th terminal and each of the output terminals from the first to the p'th is connected to each of the arrayed LEDs of 35-1~35-n. Viz., each of the first to the p'th output terminals of the first cathode driver is connected to each of the cathode of the LED elements in a set of the arrayed LEDs of 35-1~35-p. Likewise, the second anode driver 15 has the output terminals from the first to n'th. In the arrayed LEDs 35-(p+1)~35-m, each of the first to the n'th output terminals is connected to each of the anodes of the LED elements of 35-1~35-n. The second cathode driver 16 has the first to the p'th output terminals each of which is connected to the (p+1)'th~the m'th set of arrayed LEDs, 35-(p+1)~35-m.

In the first group, sets of 35-1~35-p arrayed LEDs are controlled to light dynamically as a sequence of the first to the p'th set. In the second group, sets of 35-(p+1)~35-m arrayed LEDs are controlled to light dynamically as a sequence of the (p+1)'th to the m'th set. In this way, a latent image region on the photosensitive body drum is divided into two parts of the left and the right in the main scanning direction so as to prolong an exposing time at every set of arrayed LEDs in order to ensure an appropriate exposing energy.

In the meantime, when dynamic lighting control is done at every group by dividing arrayed LEDs into a plurality of groups, a stepped deviance of exposure depending on resolution is generated between areas divided by a plane A shown in FIG. 19 (a boundary plane between the arrayed LEDs 35-p and the arrayed LEDs 35-(p+1)). As shown in FIG. 20, in the first group, when a dynamic lighting control is sequentially done from the first set of arrayed LEDs 35-1, light is exposed obliquely in an aligning direction of sets of arrayed LEDs at an arrayed LED unit (lowering to the right as shown in FIG. 20) because of time sharing exposure to the photosensitive body drum rotating at a printing speed of S. While, in the second group, since a dynamic lighting control is sequentially done from the (p+1)'th set of arrayed LEDs, 35-(p+1), the stepped deviance of exposure is inevitably generated at the boundary plane A so that a good image can not be obtained.

An exposing time for one scanning T line needs to be determined within a sheet transporting time under a resolution so that an exposing time is determined as satisfying the relationship, T line(s/line)<1/{S(mm/s)×resolution(dot/line) }×25.4. Therefore, when the above relationship is satisfied and the exposing time T line is made maximum (under the condition of a maximum exposing time), a stepped deviance of exposure for a resolution is generated.

As a result of generating the above mentioned stepped deviance, when lines vertical to the sheet transporting direction are alternately repeated to print, a boundary part showing the stepped deviance is emphasized as if a vertical line appears to exist according to a characteristic of human visual perception as shown in FIG. 21.

Whatever the case may be heretofore, a good image cannot have been formed, when dynamic lighting control is done at every group by dividing arrayed LEDs into a plurality of groups.

SUMMARY OF THE INVENTION

An object of the present invention is to provide an image forming apparatus wherein a desired exposing line can be obtained by correcting an oblique exposure with a dynamic lighting control.

Another object of the present invention is to provide an image forming apparatus wherein a desired exposing line can be obtained by correcting a deviance caused by an accuracy of fixing a printer head.

Yet another object of the present invention is to provide an image forming apparatus that forms a good image even if sets of arrayed LEDs are divided into a plurality of groups and each group is controlled dynamically to light.

To solve the above problems and according to the present invention, an image forming apparatus comprises a print head having plural sets of arrayed illuminants aligned along a main scanning direction, the sets of arrayed illuminants being dynamically controlled to light so as to expose an image bearing body which moves in an auxiliary scanning direction at a predetermined speed for forming an image and a control means for lighting which dynamically controls to light the sets of arrayed illuminants according to an exposing data selected from an image data of a precedent line or from an image data of a current line based on a predetermined correcting value.

With the above image forming apparatus, an oblique exposure with respect to the main scanning direction is corrected so that a control for oblique exposure correcting is effectively performed with a simple constitution.

For example, when the first set to the m'th set of arrayed illuminants are dynamically controlled to light with this sequence, the control means for lighting determines whether the M'th (M is an integer equal to or greater than 1 and equal to or less than m) set of arrayed illuminants shall be dynamically controlled to light using an image data of the precedent line or an image data of a current line, based on a select signal generated in accordance with a deviance amount between an actual exposing line of the arrayed illuminants and an ideal exposing line, a scanning density or a scanning number of times. Further, the control means for lighting dynamically controls to light a set of arrayed LEDs behind the M'th set of arrayed illuminants in a main scanning direction using an image data of the one precedent line when the M'th set of arrayed illuminants is dynamically controlled to light using an image data of one preceding line.

The control means for lighting comprises a first-a third line buffer memories on which an image data for one line is written and a memory control circuit that controls to write an image data for one line to the writing line buffer memory as a line buffer memory by selectively writing the first~the third line buffer memories while controlling to read an image data for one line from the reading line buffer memory as a line buffer by reading one of other line buffer memories based on the select signal. Further, the control means for lighting comprises a circuit for rearranging data that rearranges image data read from the reading line buffer so as to reverse data array among adjacent sets of arrayed illuminants and communicate the rearranged image data to the print head and a circuit for controlling arrayed illuminants that dynamically controls to light the print head in accordance with the rearranged image data. The circuit for controlling arrayed illuminants dynamically controls to light the arrayed illuminants in accordance with a clock signal having a frequency k (K>1) times the scanning speed. Thus, a driving circuit such as an LED driver for correcting obliquity can be united to one.

Further, according to the present invention, it is preferable that a plurality of print heads are aligned and each of the heads is dynamically controlled to light by the control means for lighting. Thus, exposing lines can be corrected to be parallel with a plurality of print heads even if the print heads are not fixed accurately.

Further, according to the present invention, an image forming apparatus comprises a position detecting means which generates a position detecting signal by detecting a deviation from a predetermined standard fixing position of the exposing head and a control means for lighting which controls dynamically to light the arrayed illuminants in accordance with an exposing data selected from the image data from an (k−1)-line-precedent image data to a current image data (k is an integer greater than 1) based on a correcting value which is set in compliance with a deviation denoted by the position detecting signal.

Thus, since, by detecting a deviation between a fixing position of the exposing head and the predetermined standard fixing point, arrayed illuminants are dynamically controlled to light in accordance with an exposing data which is selected from image data based on a correcting value which is set in compliance with a deviation denoted by the position detecting signal, a desired exposing line can be exposed by correcting exposing deviation caused by a fixing accuracy.

For example, the exposing head is provided with a first to m'th set (m is an integer greater than one) of arrayed illuminants together with a light-emitting element. When controlling dynamically to light the sets of arrayed illuminants in a sequential order of the first to the m'th set, the position detecting means detects a deviation from the standard fixing position in accordance with a distribution of received light from the light-emitting element. The control means for lighting controls dynamically to light the M'th set of arrayed illuminants in accordance with an exposing data selected from the image data from an (k−1)-line-precedent image data to a current image data based on a deviance amount between an actual exposing line of the M'th set of arrayed illuminants which is selected by the position detecting signal. Thus, with simple constitution, a deviation caused by fixing accuracy can be corrected.

The position detecting means has a plurality of light accepting elements and detects a deviation from the standard fixing position according to a deviation between the distribution of received light of a light accepting element as a standard light accepting element and the predetermined distribution of received light. Thus, a deviation of a fixing position of an exposing head is easily detected.

The control means for lighting has a first to a K'th line buffer memories to each of which a line of an image data is written and a memory control circuit which controls to light according to a line of an image data which is read from a line buffer memory selected from other line buffer memories based on the position detecting signal while a line of an image data is written to a line buffer memory selected from the first to the K'th line buffer memories. The control means for lighting further has a circuit for rearranging data which rearranges an image data read from the line buffer memories so as to reverse its data arrangement between adjacent arrayed illuminants and an arrayed illuminant control circuit which controls dynamically to light the exposing head. The arrayed illuminant control circuit controls dynamically to light the arrayed illuminants in accordance with a deviation from the standard fixing position. Thus, driver circuits such as an LED driver can be united when correcting obliquity by a dynamic lighting control.

Further, according to the present invention, an image forming apparatus comprises a position detecting means for detecting a deviation from a standard fixing position predetermined for each exposing head and for generating a position detecting signal and a control means for lighting arrayed illuminants of each exposing head in accordance with a exposing data which is an image data selected from the image data from an (k−1)-line-precedent image data to a current image data (k is an integer greater than 1) based on a correcting value which is set in compliance with a deviation denoted by the position detecting signal.

Thus, exposing lines of a plurality of exposing heads can be corrected to parallel each other even though a fixing accuracy is accurately determined.

Further according to the present invention, when the image forming apparatus has a print head having a plurality of arrayed illuminants aligned in the main scanning direction and divided into a plurality of groups and an image is formed on an image bearing body moving in the auxiliary direction at a predetermined scanning speed by controlling dynamically to light the arrayed illuminants for each group in accordance with a predetermined correcting value, the image forming apparatus further comprises an lighting control means in which an exposing data is selected from an image data of the one precedent line or an image data of the current line and the arrayed illuminants is controlled dynamically to light in accordance with the exposing data.

In this case, the predetermined sequential order of lighting is, for example, an order to light sequentially from a set of arrayed illuminants nearest to the boundary plane or the predetermined sequential order of lighting may be an order to light sequentially from a set of arrayed illuminants furthest to the boundary plane. Thus, a stepped deviance at a boundary part can be avoided giving a good image.

Further, according to the present invention, an image forming apparatus preferably comprises a control means for lighting which controls dynamically to light each group of sets of arrayed illuminants according to an exposing data which is an image data selected from an image data of a current line and an image data of a one precedent line based on a predetermined correcting value. Thus, since an oblique exposure is corrected, a stepped deviance at a boundary part between groups can be prevented.

BRIEF DESCRIPTION OF THE DRAWINGS

FIG. 1 to FIG. 4 are drawings illustrating a first embodiment of an image forming apparatus according to the present invention.

FIG. 1 is a block diagram showing a exposing control system along with an LED print head according to a first embodiment of the present invention.

FIG. 2 is a detailed drawing illustrating an LED print head shown in FIG. 1.

FIG. 3 is a schematic drawing illustrating correction of a perpendicular amount from a fixed point.

FIG. 4 is a schematic drawing illustrating detection of perpendicular amount in an LED printer having a plurality of LED print heads.

FIG. 5 to FIG. 13 are drawings illustrating a second embodiment of an image forming apparatus according to the present invention.

FIG. 5 is a block diagram showing an exposing control system along with an LED print head according to a second embodiment of the present invention corresponding to FIG. 1.

FIG. 6 is a detailed drawing illustrating an LED print head shown in FIG. 5.

FIG. 7 is a timing chart illustrating a control of an LED print head shown in FIG. 6.

FIG. 8 is a schematic drawing shown aligns of dots in case of an exposing speed four times a scanning speed (linear speed).

FIG. 9 is a schematic drawing illustrating a relationship between arrayed LEDs and an oblique exposing correction.

FIG. 10 is a table showing an example for determining a set of arrayed LEDs beginning to be corrected.

FIG. 11 is a schematic drawing showing a wiring pattern when the LED print head of FIG. 6 is disposed on a printed circuit board.

FIG. 12 is a schematic drawing illustrating an aligning state of a plurality of LED print heads.

FIG. 13 is a schematic drawing illustrating correction of a perpendicular amount from a fixed point.

FIG. 14 is a block diagram showing an exposing control system along with an LED print head according to a third embodiment of the present invention corresponding to FIG. 1.

FIG. 15 is a schematic drawing illustrating an example of sequential order of exposing in an image forming apparatus according to the embodiment.

FIG. 16 is a schematic drawing showing a relationship between a scanning direction and a paper transporting direction along with an order of data generation.

FIG. 17 is a schematic drawing showing another example of an order of exposing in an image forming apparatus according to the embodiment.

FIG. 18 is a schematic drawing showing an example of a method for correcting a stepped deviance in an image forming apparatus according to the embodiment.

FIG. 19 is a schematic drawing showing an example of arrayed LEDs used in the third embodiment according to the present invention or in a prior art.

DETAILED DESCRIPTION OF THE PREFERRED EMBODIMENT

Figure 1:
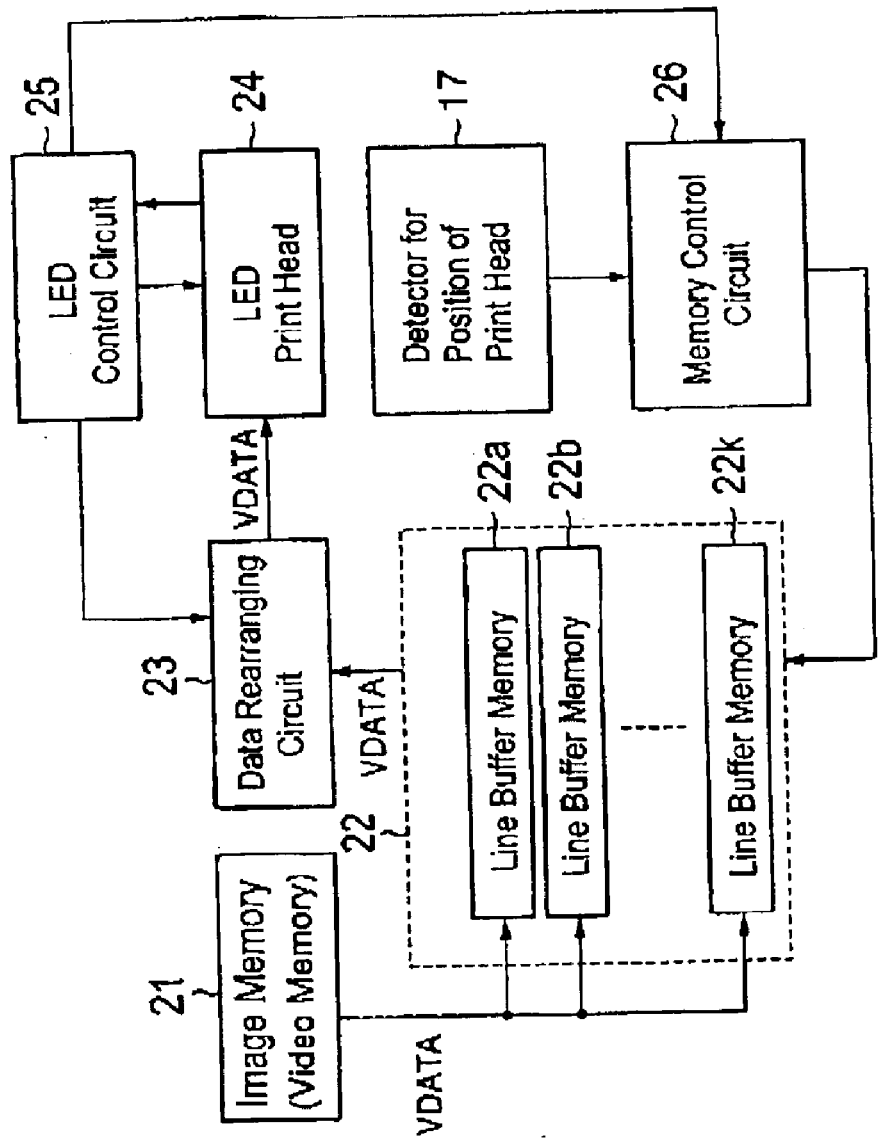

The invention will now be described below in detail by way of example with reference to the accompanying drawings. It should be understood, however, that the description herein of specific embodiments such as to the dimensions, the kinds of material, the configurations and the relative disposals of the elemental parts and the like is not intended to limit the invention to the particular forms disclosed but the intention is to disclose for the sake of example unless otherwise specifically described.

FIG. 1 to FIG. 4 are drawings illustrating a first embodiment of an image forming apparatus according to the present invention. Now referring to FIG. 1, an LED printer using an LED print head as an exposing head in an image forming apparatus is explained. An LED printer has an image memory (a video memory) 21, a buffer memory circuit 22, a data rearranging circuit 23, a memory control circuit 26, an LED print head 24, an LED control circuit 25 and a detector for a position of a print head 17. The detector for a position of a print head 17 detects a deviation (hereinafter referred to as a perpendicular amount) between a position of the LED print head 24 and a standard position of the LED print head 24 to be fixed. The memory control circuit 26 controls to select and read an image data from image data from a data of a k−1 precedent line to a data of a current line for exposing an image.

The image memory 21 stores an image data (VDATA), which is temporarily stored in the buffer memory circuit 22. The buffer memory circuit 22 has a first to a K'th of line buffer memories 22a~22k. K lines of image data are written onto the line buffer memories 22a~22k by controlling by the memory control circuit 26 and a line of image data is read as described later.

A line of image data read from the buffer memory 22 is communicated to the data rearranging circuit 23 where the data are rearranged as described later. The rearranged data are communicated to the LED print head 24 which is controlled to drive by the LED control circuit 25, i.e. controlled dynamically to light.

Figure 2:
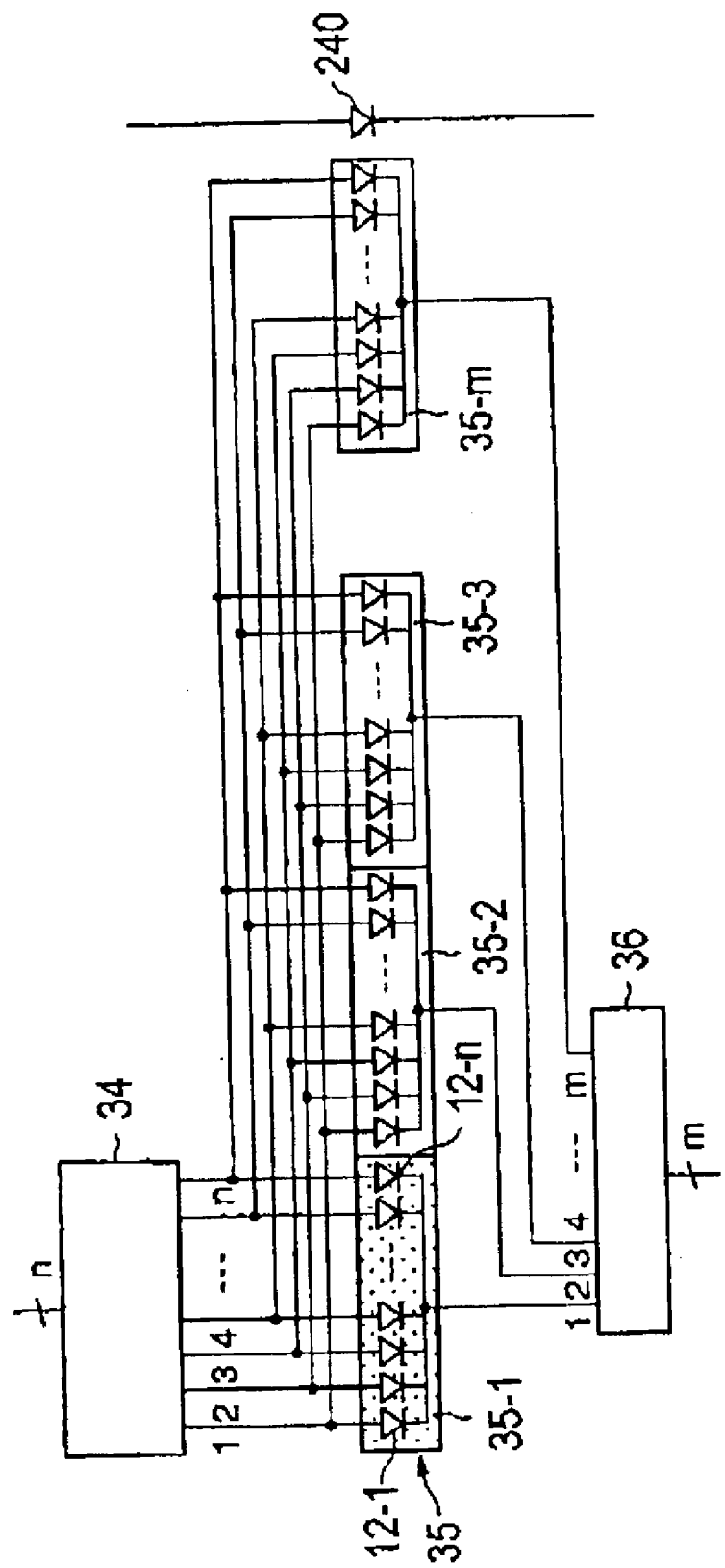

Now referring to FIG. 2, the LED print head 24 has an anode driver 34, a cathode driver 36, an LED exposure device 35 and an LED element 240. In the example shown in the drawing, an LED exposure device 35 has a first to m'th arrayed LEDs of 35-1~35-m (m is an integer greater than 1). Each arrayed LEDs 35-1~35-m has n LED elements 12-1~12-n. The first to the m'th arrayed LEDs of 35-1~35-m are aligned along the main scanning direction.

An anode driver 34 has a first to an n'th output terminals, each of which is connected to each anode of LED elements of 12-1~12-n respectively in the arrayed LEDs 35-1~35-m. While, the cathode driver 36 has a first to an m'th output terminals, each of which is connected to each common cathode of LED elements in each of the arrayed LEDs 35-1~35-m.

Rearranged image data (VDAT) are communicated to an n-bits shift resister (not shown), which is provided to the LED print head 24. The n-bits shift resister stores rearranged image data while shifting arranged image data in step of one bit in accordance with a clock signal which is transmitted from the LED control circuit. The clock signal has a rate (frequency) integral multiple the linear speed of a photosensitive body drum. The clock signal is communicated to a clock counter (not shown), which count according to the signal. When the clock counter counts n bits, i.e. according to a falling edge of the n'th bit, it generates a count-up signal as a latching signal.

An n-bits data latch (not shown) provided to the LED print head 24 latches the rearranged image data which is stored onto the n-bits shift register when it receives a latch signal, i.e. at the rising edge of the latch signal (hereinafter referred to as a latched image data). When the rearranged image data is latched to the n-bits data latch, the anode driver 34 conducts current to the anode of the LED element 20-r in each arrayed LED of 35-1~35-m through the r'th output terminal by switching on a built-in constant current source according to a latch image data, for example when the r'th bit of the latch image data (r is an integer belonging to 1~n) is high level ("1").

A synchronizing signal for horizontal writing is communicated to an m-bits shift register (not shown) provided to the LED print head 24 from the LED control circuit 25. The m-bits shift register is cleared by the synchronized signal for horizontal writing. When the m-bits shift register is cleared, the cathode driver 36 becomes in disable state (inactive state). While, m-bits register enables the first output terminal of the cathode driver 36 by the first rising edge of the latch signal when the latch signal is communicated to the m-bits shift register.

The latch signal is communicated also to the LED control circuit 25 and a strobe signal is communicated to the cathode driver 36 as synchronized with the latch signal. The cathode driver is activated when it receives the strobe signal. For example, the cathode driver is on during when the strobe signal is low level to become the current carrying state. Here, since the first output terminal of the cathode driver 36 is enabled, the cathodes of the LED elements 12-1~12-n of the first arrayed LEDs 35-1 are in the current carrying state. Hence, LED elements whose anodes are made to be in the current carrying state by the anode driver 34 emit light.

As described above, the first arrayed LEDs 35-1 perform exposure. The m-bits shift register enables the second output terminal of the cathode driver 36 by the second rising edge of the latch signal. The latch signal is communicated also to the LED control circuit 25, which communicates a strobe signal to the cathode driver 36 as synchronized with the latch signal. The cathode driver 36 is activated when it receives the strobe signal. Since the second output terminal of the cathode driver is enabled, the cathodes of the LED elements 12-1~12-n of the second arrayed LEDs 35-2 are in the current carrying state. Hence, LED elements whose anodes are made to be in the current carrying state by the anode driver 34 emit light. Likewise, the third to the m'th arrayed LEDs 35-3~35-m emit light so as to perform exposure.

Thus, a line of exposure is formed on a photosensitive drum in accordance with a line of image data by selecting sequentially the first to the m'th arrayed LEDs 35-1~35-m as synchronized with the rising edges of the latch signals.

Referring to FIG. 3 also, an LED element 240 is disposed opposite to a fixing benchmark 15a designating a position for fixing the LED print head 24. A detector for a position of a print head 17 is provided with a CCD for detecting a position (not shown in FIG. 2) in accordance with the LED element 240. An odd number of at least three CCD elements for detecting a position are aligned along the auxiliary scanning direction in view of fixing accuracy of the LED print head 24.

The CCD for detecting a position receives light (emitted) from the LED element 240. The CCD for detecting a position is disposed so that the amount of light received by a center CCD element (a standard CCD element) among a plurality of elements is maximum.

If the LED print head 24 is disposed at a standard fixing position, the amount of light received by the center CCD element is maximum so that the detector for a position of the print head 17 generates a detection signal of the print head of no perpendicular amount as a detection signal of a position of the print head (hereinafter referred to as a first detection signal of the print head). The first detection signal of the print head is communicated to the memory control circuit 26, which interprets as no perpendicular amount controlling to read and write from, and to the buffer memory.

Meanwhile, when the LED print head deviates from the standard fixing point (i.e., there exists a perpendicular amount), the LED element 240 also deviates from the point in proportion to the perpendicular amount so that the CCD element, which receives maximum amount of light, is determined in the position detecting CCDs. That is to say, the CCD element having maximum light received according to the perpendicular value of the LED print head deviates from the center CCD element. In other words, the actual exposing line deviates from the ideal exposing line as shown in FIG. 3(b).

Figures 3A, 3B:
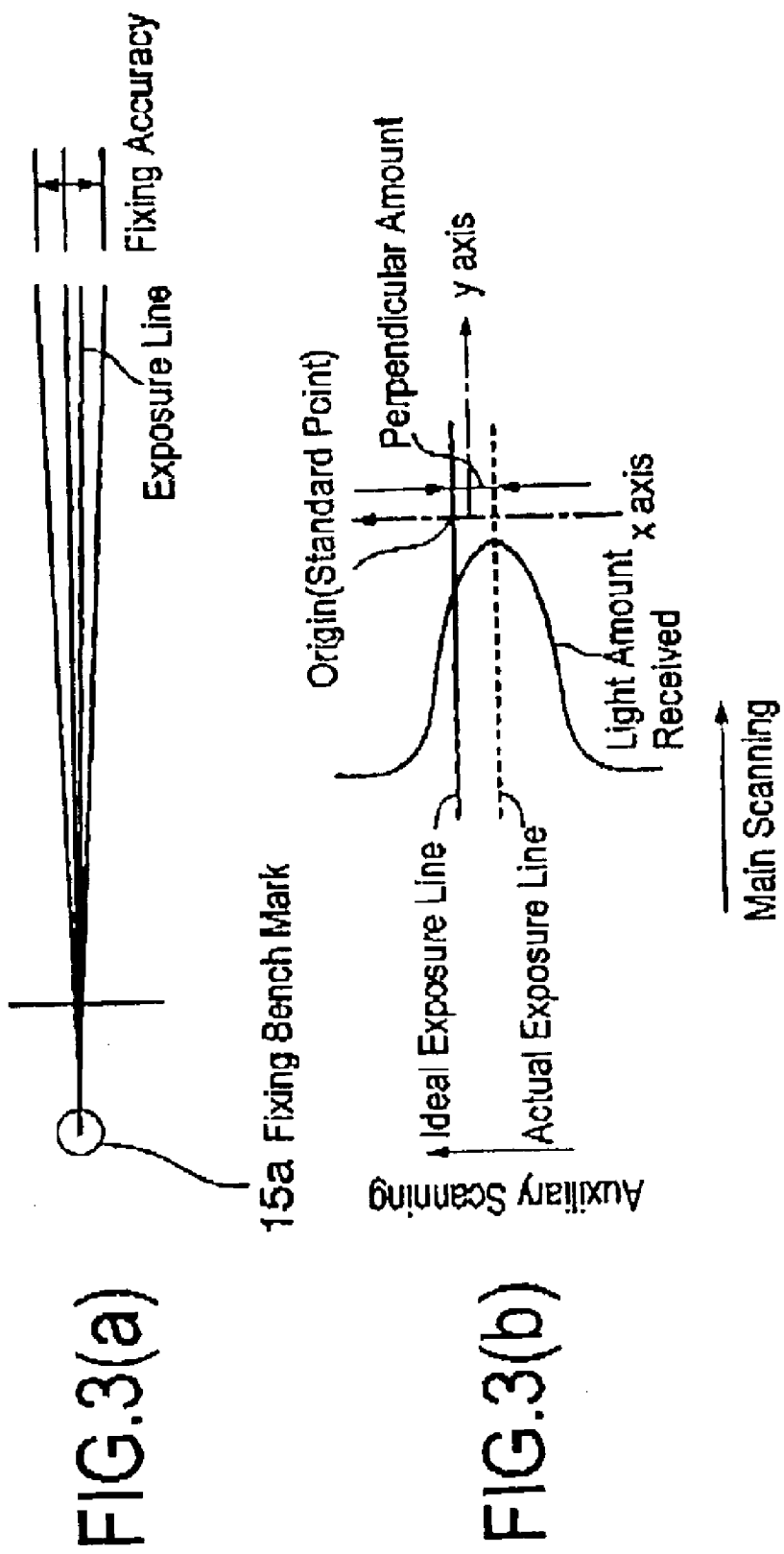

As shown in FIG. 3(b), let the origin (standard point) be the center CCD element of the detector for a position of the print head 17, the x-axis be in the auxiliary scanning direction and the y-axis be in the direction of the amount of light received. Then, every CCD element of the detector is on a x co-ordinate in the so defined co-ordinate axis. As stated previously, if the amount of light received at the origin is maximum, the detector 17 generates the first detection signal of the print head. While, if the amount of light received at the point of co-ordinate (x, 0) other than the origin is maximum, the detector 17 gets a perpendicular direction and a perpendicular amount generating a detection signal denoting the perpendicular direction and the perpendicular amount (hereinafter referred to as a second detection signal of the print head). Thus, the detector 17 detects a deviation from the standard fixing point in accordance with a distribution of the amount of light received by the LED element 240. In other words, a deviation from the standard fixing point is detected by a deviation of a distribution of light received between a CCD element and a predetermined standard CCD element.

The second detection signal of the print head is communicated to the memory control circuit 26, which control to read and write from and to the buffer memory. K lines of image data have been written onto the buffer memory 22. The memory control circuit 26 reads an image data from one of the first~the K'th buffer memories 22a~22k in accordance with a correcting value which have been set in advance on the memory control circuit 26 based on a perpendicular direction (whether plus side or minus side with respect to the auxiliary scanning direction) and a perpendicular amount (hereinafter referred to as a perpendicular value for a combined concept of the amount and the direction). The memory control circuit 26 selects to read one of the image data from k-1 lines precedent to the current line for controlling on the basis of the deviation between a fixed position shown by the LED element 240 and a standard fixing point.

For example, a line buffer memory from which an image data is read is changed to a line buffer memory determined by a correcting value from a standard line buffer memory, which is read in case of zero perpendicular value. The standard line buffer memory is always a current line data. The correcting value is determined for every arrayed LED according to the perpendicular value from the fixing benchmark 15a. The memory control circuit 26 reads an image data from one of the first to the K'th line buffer memories 22a~22k for each set of arrayed LEDs. Namely, the circuit selects to read an image data from image data of from the K-1 precedent line to the current line. In other words, a line of image data (each different) is written onto each of the first~the K'th line buffer memories. The memory control circuit 26 selects a line buffer memory from the first to K'th line buffer memory 22a~22k as a buffer memory for writing to which a line of image data is written while selecting a line buffer memory from other line buffer memories on the basis of a position detecting signal as a buffer memory for reading from which a line of image data is read.

An image data read from the buffer memory circuit 22 is communicated to the data rearranging circuit 23 where data are rearranged. Since a plurality of arrayed LEDs are lighted in a time-shared manner by the dynamic lighting control as described before, a plurality of arrayed LEDs are driven by one LED driver (i.e., an anode driver and a cathode driver). When a plurality of arrayed LEDs 35-1~35-m are connected to the anode driver 34 and the cathode driver 36, a wiring pattern needs to be a single stroke pattern. Therefore, data need to be rearranged so that data arrangement is inverted between adjacent sets of arrayed LEDs.

Hence, the data rearranging circuit 23 rearranges image data alternately in a unit of arrayed LEDs (i.e. in a n-bits unit), which is to say if an image data of odd number is an order of 1, 2, 3, 4, ..., n, then an image data of even number is rearranged in an order of n, ..., 4, 3, 2, 1. Thus, the data rearranging circuit 23 rearranges image data and the rearranged data is communicated to the LED print head 24. According to the rearranged image data, exposure is performed.

Thus, since the buffer memory is controlled to read and write according to the perpendicular value so as to dynamically control to light, it is unnecessary to fix the LED print head with too much care. As a result, a workload for fixing can be lightened.

Now referring to FIG. 4, each LED print head has the aforementioned CCD for detecting position in case of a tandem system. An LED printer comprises a first~a p'th LED print heads 24-1~24-p (p is an integer greater than one) and each print head is constituted as explained in FIG. 2. Each of LED elements 240-1~240-p is disposed on an opposite side of each of fixing benchmarks 15a. A detector for a position of a print head 17 has CCDs for detecting a position 51-1~51-p corresponding to LED elements 240-1~240-p. Every CCDs for detecting a position 51-1~51-p has q CCD elements 52-1~52-q disposed along an auxiliary scanning direction in view of fixing accuracy (q is an odd number greater than 2).

Each of CCDs for detecting a position 51-1~51-p receives light from each of LED elements 240-1~240-p. The detector for a position of a print head 17 gets a distribution of light amount received for each of CCD elements 52-1~52-q finding a perpendicular value of each CCD for detecting a position and communicating the first or the second position detection signal of the print head to the memory control circuit 26. The memory control circuit finds each correcting value for each of print heads 24-1~24-p controlling to read the buffer memory circuit 22 according to the correcting value.

In an example shown in FIG. 4, the second LED print head 24-2 deviates to minus side (adverse direction to the auxiliary scanning direction) and the third LED print head 24-3 deviates to plus side (auxiliary scanning direction). If aforementioned control for reading is performed for the second and the third LED print heads 24-2 and 24-3, exposure is done along the ideal exposure line to obtain a good image without print deviance for a color image.

Thus, an LED printer having a plurality of LED print heads can form a good image even if a fixing accuracy (parallelism) is not so strict so that a workload for fixing print heads can be lightened resulting in decreasing production cost. Providing with line buffer memories for K lines for controlling to read, deviation between the print heads can be corrected at a unit of 1/n (dot/line) in the range of K lines and deviation in the main scanning direction can be corrected at a unit of arrayed LEDs.

As explained above, in the present embodiment, the LED print head which has a plurality of arrayed LEDs aligned along the main scanning direction has an effect of being capable of exposing a desired exposure line corrected a deviance caused by fixing accuracy because the M'th arrayed illuminants are dynamically controlled to light according to an exposure data which is selected from image data from k-1 lines precedent to the current line on the basis of the correcting value determined according to a fixing deviation of the LED print head from the fixing benchmark by detecting a deviation of the LED print head from the predetermined fixing point when forming an image by exposing on the image bearing body moving in the auxiliary scanning direction.

According to the present embodiment, when the first the m'th arrayed illuminants are dynamically controlled to light, a deviation from a fixing benchmark is detected by a distribution of light amount received from the light emitting elements which is provided to each LED print head. One of image data from the k-1 line precedent line to the current line is selected to control dynamically to light the M'th arrayed illuminants with the image data on the basis of a deviance between the exposing line of the M'th arrayed illuminants selected according to the extent of the deviation. Thus, an exposure deviation caused by a fixing accuracy can be corrected with a simple constitution.

Further according to the present embodiment, since a deviation from the standard fixing point is detected according to the difference of a distribution of light amount received of a standard photo acceptance element from a predetermined distribution of light amount received using a plurality of photo acceptance elements, a fixing deviation of the print head is easily detected.

Further according to the present embodiment, a first—a k'th line buffer memory for writing a line of image data is provided. Image data are written to the line buffer memories and controlled to read according to the position-detecting signal, and exposing deviation caused by a fixing accuracy can be easily corrected. Further according to the present embodiment, since image data read from the reading line buffer memory is rearranged as a rearranged data so that the data arrangement reverses with respect to the adjacent arrayed illuminants, the image forming apparatus has an effect of unifying driver circuits such as LED drivers in a dynamic lighting control.

Further according to the present embodiment, since, in the image forming apparatus having a plurality of LED print heads, a fixing deviation from a fixing benchmark is detected so as to control dynamically to light for each LED print head according to each deviation, exposure lines are corrected parallel for a plurality of LED print heads even though fixing accuracy of LED print heads is not so strict.

Figure 5:
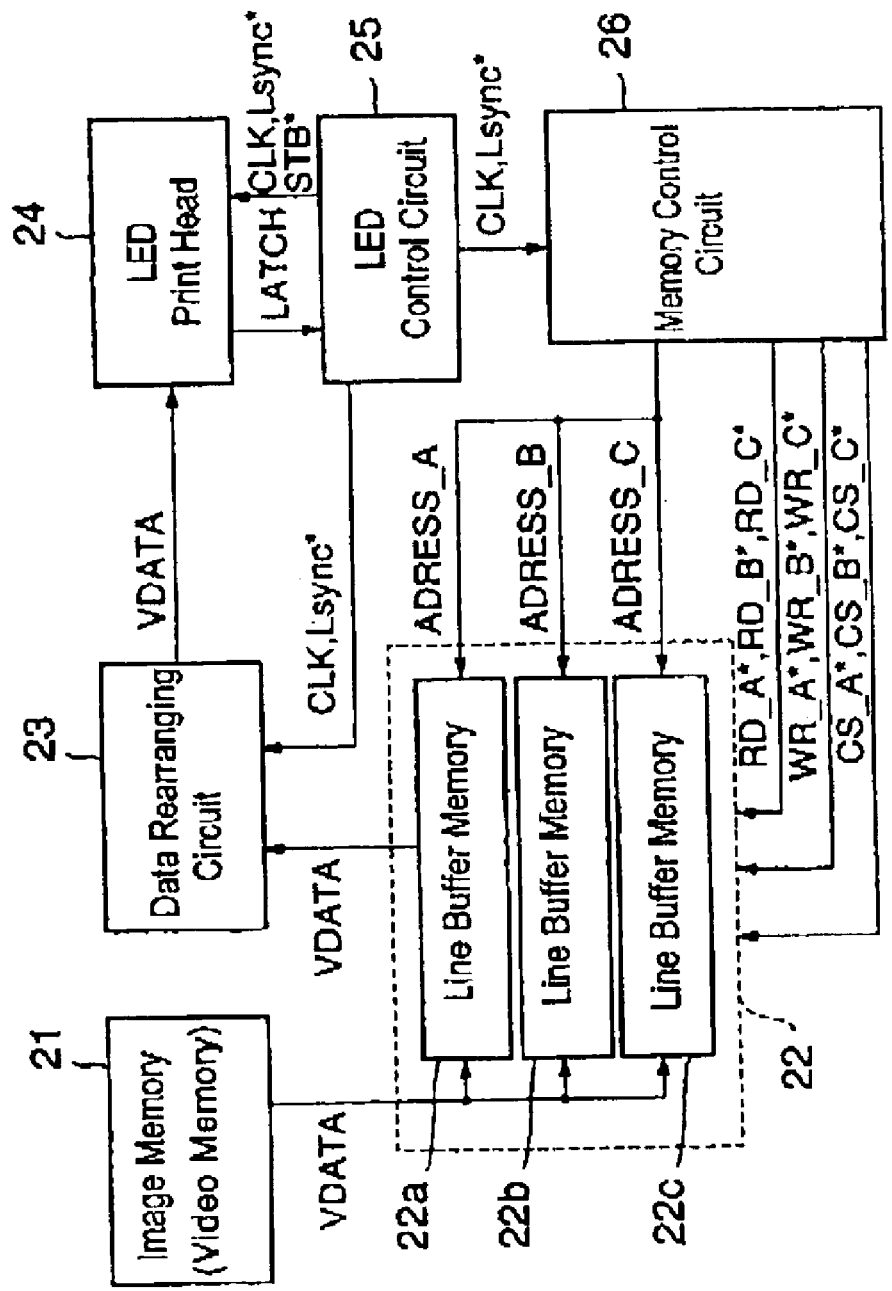

FIG. 5 to FIG. 13 are drawings illustrating a second embodiment of an image forming apparatus according to the present invention. Referring to FIG. 5, an LED printer using an LED print head is explained as an image forming apparatus. An LED printer shown in FIG. 5 has an image memory (a video memory) 21, a buffer memory circuit 22, a data rearranging circuit 23, an LED print head 24, an LED control circuit 25 and a memory control circuit 26 identically with the first embodiment. Scanning number of times is set up to k times the predetermined scanning speed. Exposure is done by dividing one dot into k times. An image data of a precedent exposing line is exposed according to an oblique correcting value by storing an exposing data (an image data) of one precedent scanning in the buffer memory circuit 22.

An image data (VDATA) is stored in the image memory 21. The stored image data is temporarily transferred to the buffer memory circuit 22 having a first—a third line buffer memories 22a~22c as shown in the example of FIG. 5. The line buffer memories are controlled by the memory control circuit and an image data for one line is written and read on the memory.

An image data (an image data for one line), which is read from the buffer memory circuit 22, is communicated to the data rearranging circuit 23 where data is rearranged as stated later. The rearranged data is communicated to the LED print head 24 that is controlled to drive by the LED control circuit 25, i.e., dynamically controlled to light.

Figure 6:
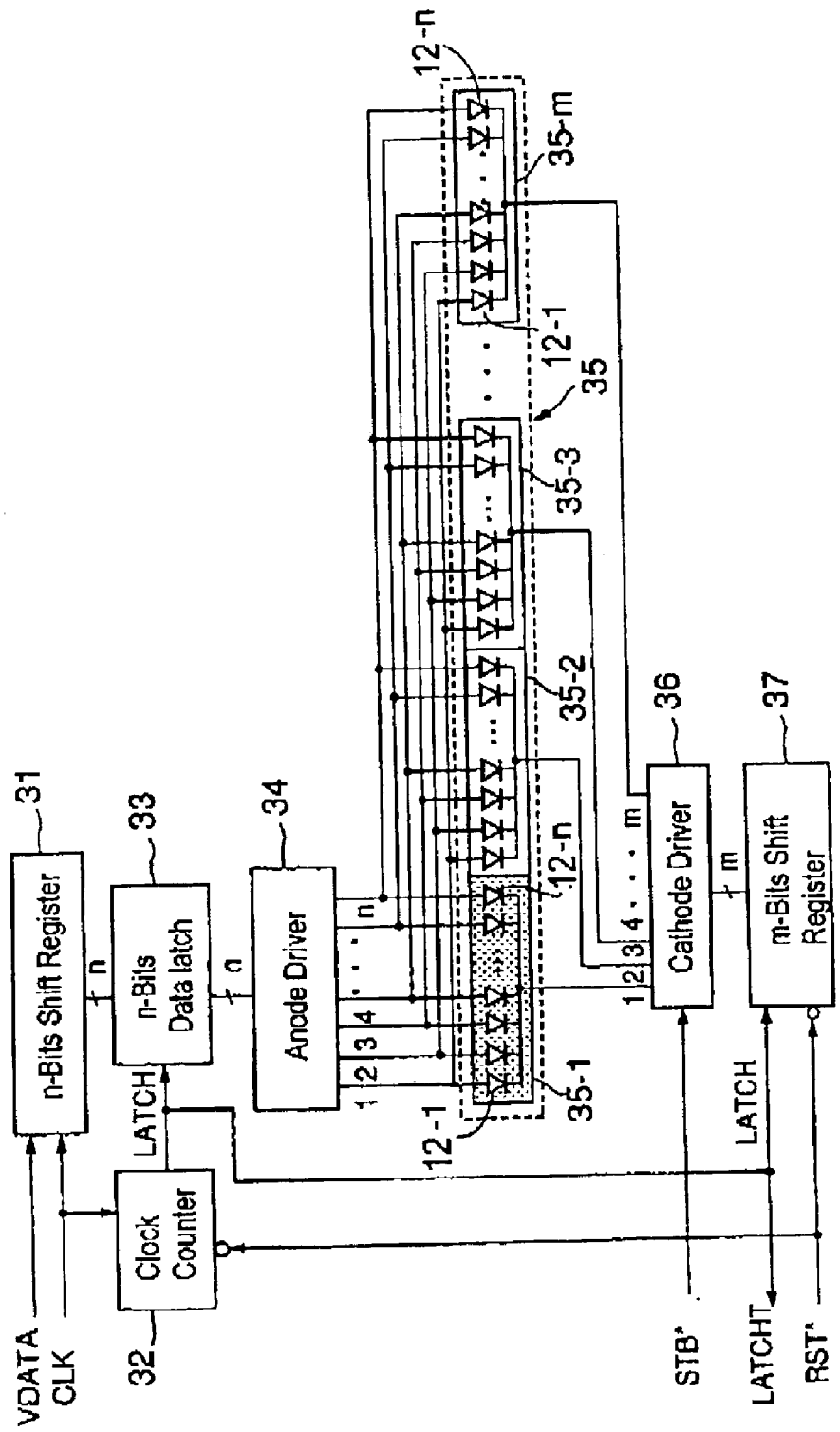

Referring to FIG. 6, the LED print head 24 has a first shift register (n-bits shift register) 31, a clock counter 32, a data latch circuit (n-bits data latch) 33, an anode driver, LED exposing device 35, cathode driver 36 and a second shift register (m-bits shift register) 37. The LED exposing device has a first~an m'th arrayed LEDs 35-1~35-m, where m is an integer greater than one. Each of the arrayed LEDs 35-1~35-m has n LED elements 12-1~12-n. The first-the m'th arrayed LEDs 35-1~35-m are aligned in the main scanning direction.

The anode driver 34 has a first~an n'th output terminals each of which is connected to each of anodes of LED elements 20-1~20-n respectively of each of arrayed LEDs 35-1~35-m. Meanwhile, the cathode driver 36 has a first~an m'th output terminals each of which is connected to each common cathode of each of the first the m'th arrayed LEDs 35-1~35-m.

Figure 7:
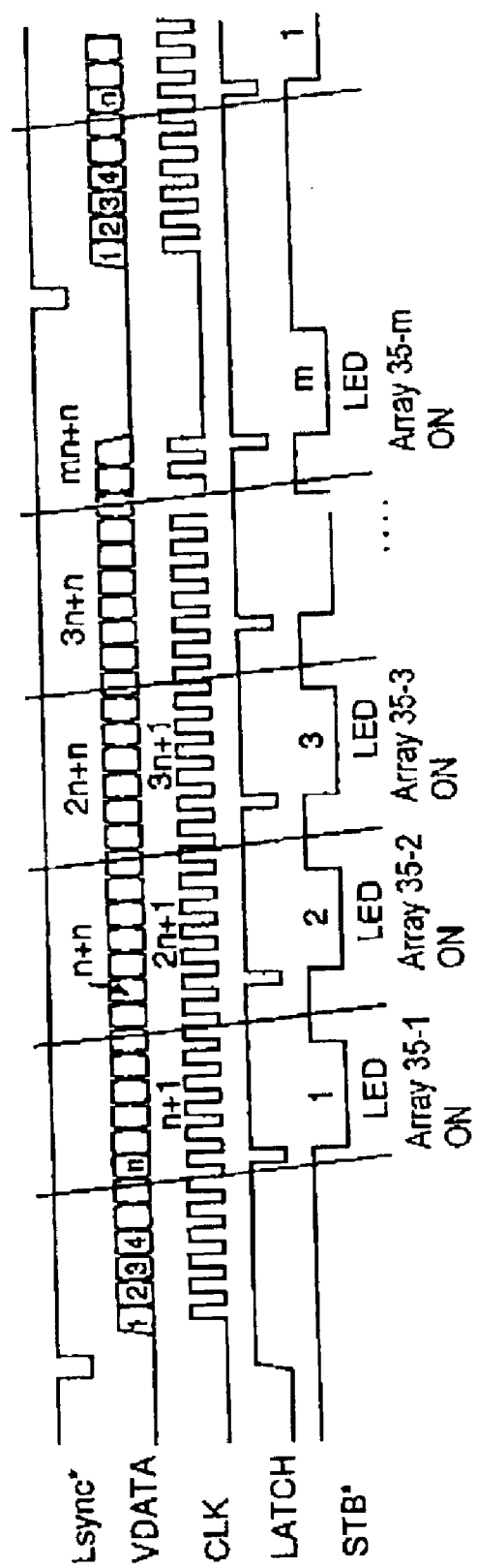
Figure 11:
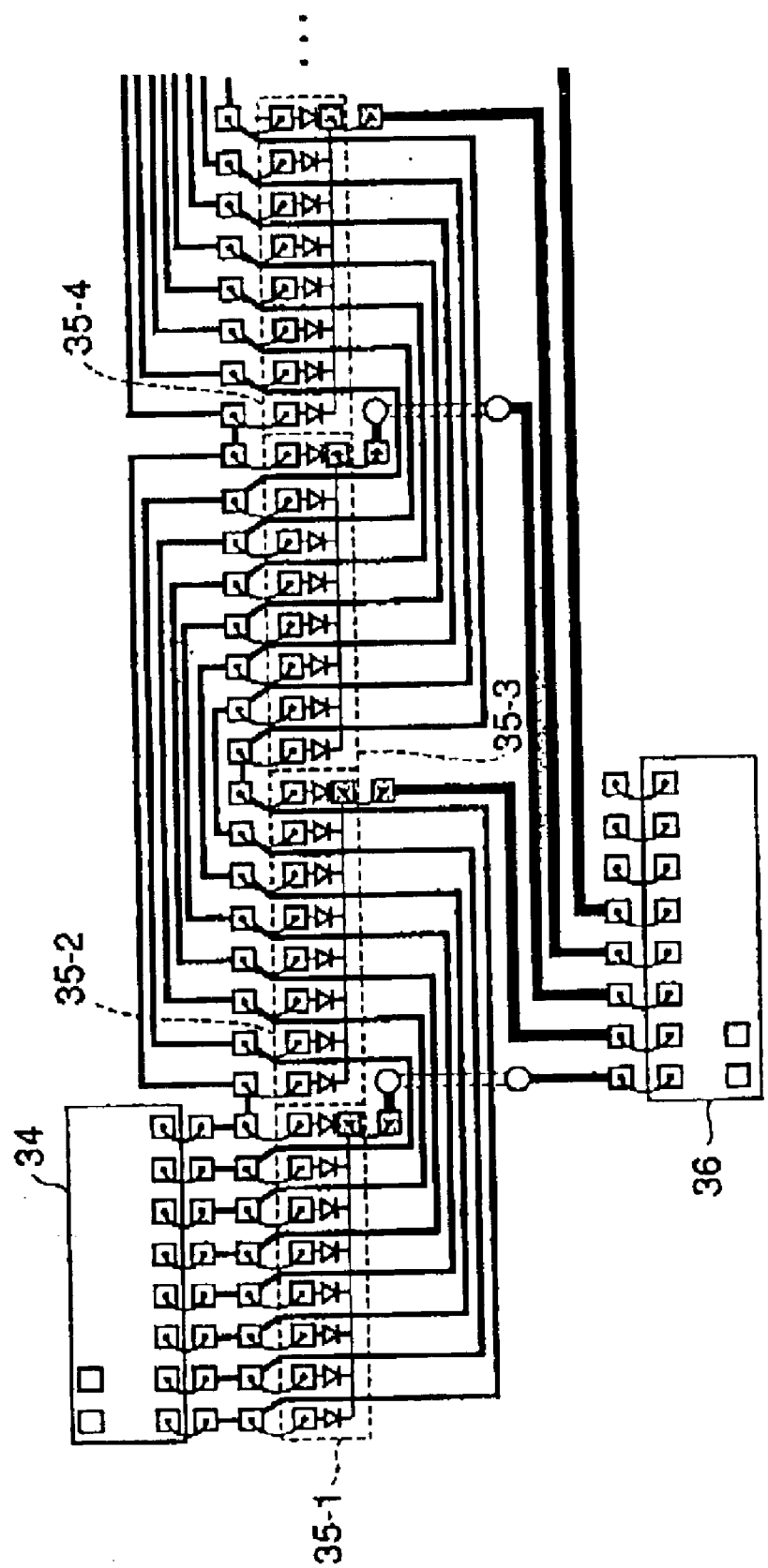

Now referring also to FIG. 7, a rearranged data is communicated to the n-bits shift register 31 that shifts the rearranged data in increment of one bit according to the clock signal CLK given by the LED control circuit 25 storing the rearranged data. The clock signal CLK has a frequency k times the linear speed. The clock signal CLK is given to the clock counter 32 that counts according to the clock signal CLK generating a count up signal as a latch signal LATCH at the descending edge of n'th bit of the clock signal CLK when having counted n bits.

The n-bits data latch 33 latches the rearranged data that is stored in the n-bits shift register 31 at the rising edge of the latch signal when receiving the latch signal (hereinafter referred to as a latched image data). When the rearranged image data is latched on the n-bits data latch 33, the anode driver 34 activates a built-in constant current switch so as to carry current through the output terminal p to the anode of the LED element 12-p of every arrayed LEDs 35-1~35-m according to the latched image data, for example in case the p'th bit of the latched image data is high level ("1").

A horizontal writing synchronizing signal Lsync* is communicated from the LED control circuit 25 to the m-bits shift register 37 which is cleared by the synchronizing signal. When the m-bits shift register 37 is cleared, the cathode driver becomes a disable state (inactive state). Meanwhile, the m-bit shift register 37 has the latch signal, making the first output terminal enable at the first rising edge of the latch signal.

The latch signal is communicated also to the LED control circuit 25 which communicates a strobe signal STB* to the cathode driver 36 in sync with the latch signal. The cathode driver 36 is on when it receives the strobe signal. For example, during when the strobe signal is low level, the cathode side is in a current carrying state. Since the first output terminal of the cathode driver is enabled, cathodes of LED elements 12-1~12-n are in a current carrying state so that the LED element whose anode is in a current carrying state by the anode driver 34 emits light.

As stated above, exposure is performed by the first arrayed LEDs while m-bits shift register 37 makes the second output terminal of the cathode driver 36 enabled at the second rising edge of the latch signal (the second latch signal). The latch signal is communicated also to the LED control circuit 25 which communicates a strobe signal STB* to the cathode driver 36 in sync with the latch signal. The cathode driver 36 is on when it receives the strobe signal. Since the second output terminal of the cathode driver is enabled, cathodes of LED elements 20-1~20-n are in a current carrying state so that the LED element whose anode is in a current carrying state by the anode driver 34 emits light.

Likewise, the third~the m'th arrayed LEDs 35-3~35-m emit light in sync with the third~m'th rising edge of the latch signal so as to perform exposure.

Thus, the first~the m'th arrayed LEDs 35-1~35-m are sequentially selected so as to form an exposed line according to image data for one line. The clock counter 32 and the second shift register (m-bits shift register) 37 are reset by a reset signal RST*.

When exposure is performed separately as stated above, the exposed line is drawn obliquely as explained in the section of the related art. Accordingly, scanning number is increased up to k times the scanning speed (linear speed of the photosensitive body drum) and exposure is done by dividing one dot into k times. Namely, as shown in FIG. 8, a dot 51 on the one line is divided into k (k=4 in case of FIG. 8) in the auxiliary scanning direction and exposure is done with k dots 51a. An image data of one precedent line is stored in the buffer memory circuit 22 and the image data of one precedent line is exposed according to an oblique correcting value as stated later. As a result, though exposure by the arrayed LEDs 35-1 is performed using an exposing data of the current line, as parting from the arrayed LEDs 35-1, a ratio exposed by a data of a precedent line increases so as to prevent the exposed line from slanting as shown in FIG. 9.

More specifically, when finding an oblique correcting value regarding the M'th arrayed LEDs 35-M, a deviation amount (a recorded position) for arrayed LEDs on the ideal line is first found in advance, where M is an integer from 1 to m.

Let the deviation amount be δ, then δ is expressed as $\delta=1/m \times \eta$, where η is an exposing time ratio (dot/array) and $\eta=T \times T_{max}$. T is a data transferring time (s/line), Tmax is a maximum time for one line which is found from a linear speed S (s/line) and expressed as $T_{max}=1/(1/S \times 25.4/D)$ where D is an imaging density (dpi).

For example, if D=600 dpi, m=40 and η=0.9 (dot/array), then a deviation amount $\eta=1/40 \times 0.9=0.0225$ (dot/array). While, since a scanning time $T1=(1/S) \times 25.4/D$, if a linear speed S=97.00 (mm/s), then $T1=1/97.00 \times 25.4/600=436.4261$ ($\mu s$/line(dot)).

Further, as for a deviation amount at the position of the M'th arrayed LEDs 35-M, the inequality, $\delta \times (M-1) > Q/q$, holds for a scanning density q and a scanning number of times Q. All image data of precedent lines are read regarding arrayed LEDs subsequent the arrayed LED which satisfies the inequality by finding the arrayed LEDs number. When the buffer memory circuit 22 is controlled to read, it is determined whether an image data of the precedent line is read or an image data of the current line is not read. Thus, when an image data is read from the buffer memory circuit 22, it is determined whether the image data of the precedent line is read or not depending on whether a select signal is 0 or 1.

For example, when D=600 dpi, m=40, η=0.9 (dot/array) and q=4', a result shown in FIG. 10 is obtained. As apparent from FIG. 10, correction begins from the 13'th arrayed LEDs 35-13 in case a scanning number of times N=1 and correction begins from the 35'th arrayed LEDs 35-35 in case a scanning number of times N=3. Thus, the smaller is the scanning number of times, the more arrayed LEDs come to beginning to be corrected.

Again, referring to FIG. 5, when image data is written from the image memory 21 to the buffer memory circuit 22, the buffer memory circuit 22 is cleared first. Namely, when exposure begins according to image data, the buffer memory circuit 22 is cleared first. Then, a write control signal is communicated to the buffer memory circuit 22 from the memory control circuit 26. For example, an image data for one line is written to the second line buffer memory 22b and the third line buffer memory 22c. If the first~the third line buffer memory 22a~22b are denoted as "A"~"C" respectively, the memory control circuit 26 communicates ADRESS_B, ADRESS_C, WR_B*, WR_C*, CS_B* and CS_C* to the buffer memory circuit 22 as a write control signal and writes image data for one line to the second and the third line buffer memory 22b and 22c respectively.

Let an image data for one line written on the second buffer memory 22b be an image data for a current line and an image data for one line written on the third buffer memory 22c be an image data for a precedent line.

After that, the memory control circuit 26 communicates ADRESS_A, WR_A* and CS_A* to the buffer memory circuit 22 as a write control signal and writes an image data for the next one line on the first line buffer memory 22a while selects the second or the third line buffer memory 22b or 22c reading an image data for one line.

When read-write controlling, the memory control circuit 26 controls switching the line buffer memories in sync with the synchronizing signal for horizontal writing Lsync*. For example, the memory control circuit controls to switch the write line buffer memory from the first line buffer memory 22a to the second line buffer memory 22b and to switch the read line buffer memory to the first line buffer memory 22a or to the third line buffer memory 22c according to the select signal. Thus, the memory control circuit 26 switches a write line memory and a read line memory controlling memories in the sequence of read(RD), read(RD) and write(WR) by a toggle action.

As stated above, image data which is read from the buffer memory circuit 22 are communicated to the data rearranging circuit 23 where the data are rearranged. A pair of LED drivers (i.e. an anode driver and a cathode driver) drives a plurality of arrayed LEDs, since a plurality of arrayed LEDs is controlled to light in time-sharing manner in the dynamic lighting control. Consequently, a wiring pattern is a so-called single stroke writing pattern when a plurality of arrayed LEDs 35-1~35-m are connected to the anode driver 34 and the cathode driver 36. Hence, image data needs to be rearranged so as to reverse its data arrangement between adjacent arrayed LEDs.

Therefore, the data rearranging circuit 23 rearranges alternately image data for unit of arrayed LEDs (i.e. n-bits unit). More specifically, if an order of image data of the arrayed LEDs of odd number is "1, 2, 3, 4, . . . ,n", then an order of image data of the arrayed LEDs of even number is rearranged to "n, . . . , 4, 3, 2, 1". Thus, the data rearranging circuit 23 rearranges image data communicating the resultant rearranged image data to the LED print head 24. And as stated above, exposure is performed according to the rearranged image data.

Thus, exposure is performed by increasing the scanning number of times to k times the linear speed (scanning speed) and by dividing one dot into k times while it is determined whether exposure is performed or not depending on a predetermined oblique correcting value by storing image data of one precedent line onto the line buffer memory. Hence, a required exposure line is realized by correcting oblique exposure using dynamic lighting control.

Figure 12:
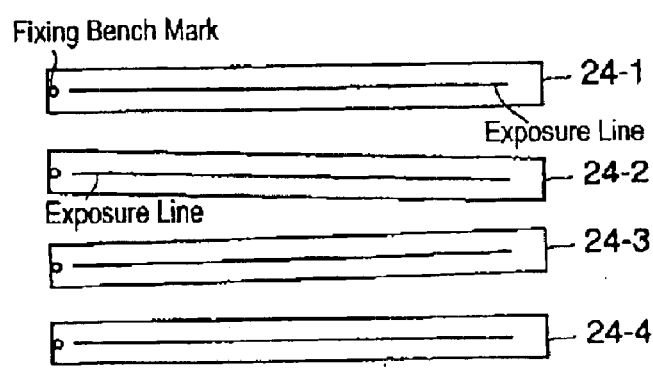
Figure 13:
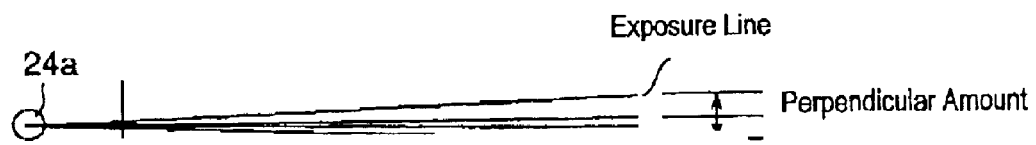

Since an LED printer having a plurality of LED print heads such as a tandem type image forming apparatus cannot form a good image if a fixing accuracy (parallelism) is not strict, it is necessary to keep strict accuracy for fixing the heads so that a workload for fixing print heads increases, which results in increasing production cost. To overcome such draw back, if line buffer memories for m lines for controlling is provided in a manner described above, deviation between the print heads can be corrected at a unit of 1/n (dot/line) in the range of m lines and deviation in the main scanning direction can be corrected at a unit of arrayed LEDs. As shown in FIG. 12, even if parallelism is not kept between an LED print head 24-2 and 24-3 in an image forming apparatus having four print heads 24-1~24-4, exposure line can be corrected to parallel among LED print heads 24-1~24-4 because the perpendicular amount within a range of m lines with respect to the standard fixing point 24a are corrected as shown in FIG. 13.

As explained above, according to the embodiment, the image forming apparatus has an advantageous effect on being capable of exposing with required exposure line by correcting oblique exposure with respect to the main scanning direction since arrayed LEDs are dynamically controlled to light according to the exposing data that is selected from an image data of one precedent line or current line according to a predetermined correcting value when an image is formed by exposing an image bearing body which moves at a predetermined scanning speed in the auxiliary direction by controlling dynamically to light arrayed LEDs according to image data.

Further according to the embodiment, the image forming apparatus has an advantageous effect on being capable of easily correcting oblique exposure since it is determined the M'th arrayed illuminants is controlled dynamically to light according to whether image data of one precedent line or current line base on a select signal which is defined according to a deviation amount between the exposure line of the M'th arrayed illuminants and the ideal line, a scanning density and scanning number of times when the first~the m'th arrayed illuminants is controlled dynamically to light in this sequence.

Further, according to the embodiment, the image forming apparatus has an advantageous effect on being capable of correcting oblique exposure with simple constitution since the arrayed illuminants which is subsequent side to the M'th arrayed illuminants in the main scanning direction is dynamically controlled to light according to image data of one precedent line when the M'th arrayed illuminants is dynamically controlled to light.

Further, according to the embodiment, the image forming apparatus has an advantageous effect on being capable of easily controlling to read image data since image data is controlled to read according to a select signal by providing the first~the third line buffer memories which image data are written onto.

In addition, according to the present invention, the image forming apparatus has an advantageous effect on being capable of unifying driver circuits such as LED drivers when controlling dynamically to light since image data which is read from the line buffer memory for reading are rearranged as rearranged image data so as to reverse its data arrangement between adjacent arrayed LEDs.

Further, according to the embodiment, the image forming apparatus having a plurality of print heads has an advantageous effect on being capable of correcting exposure lines parallel with a plurality of print heads even if accuracy for fixing the print heads is not severely restricted since the dynamic control for lighting is performed for each print head.

Figure 14:
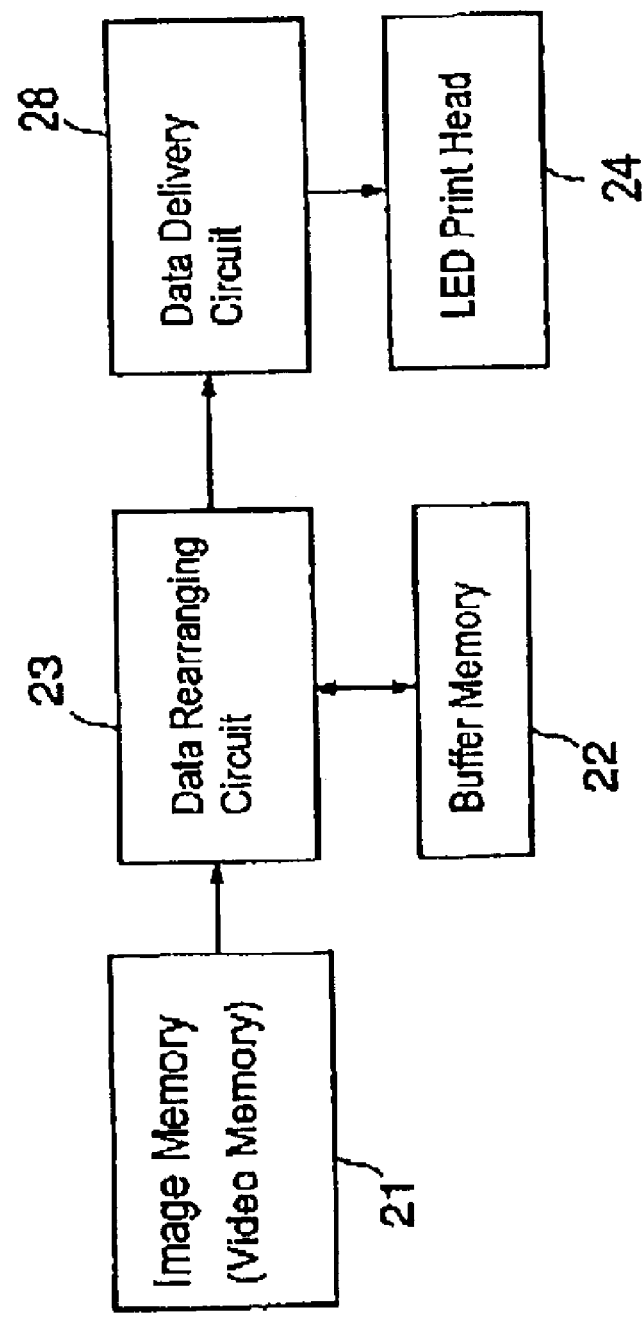
FIG. 14 to FIG. 19 are drawings illustrating a third embodiment of an image forming apparatus according to the present invention.
Figure 15:
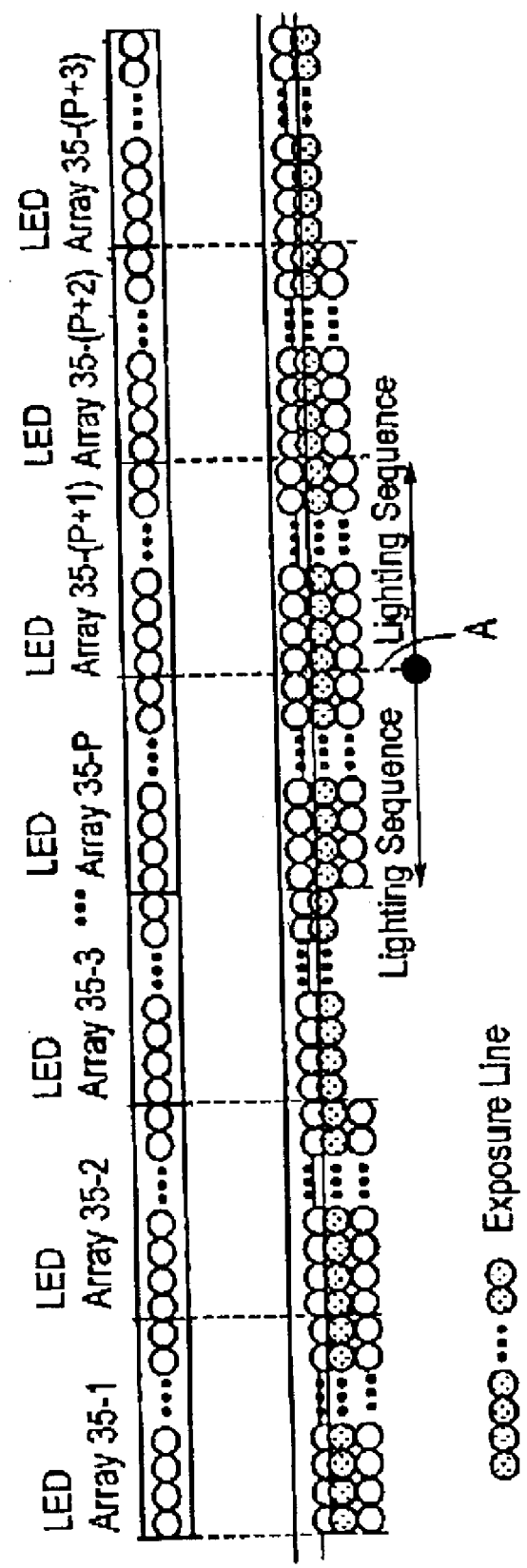
Figure 16:
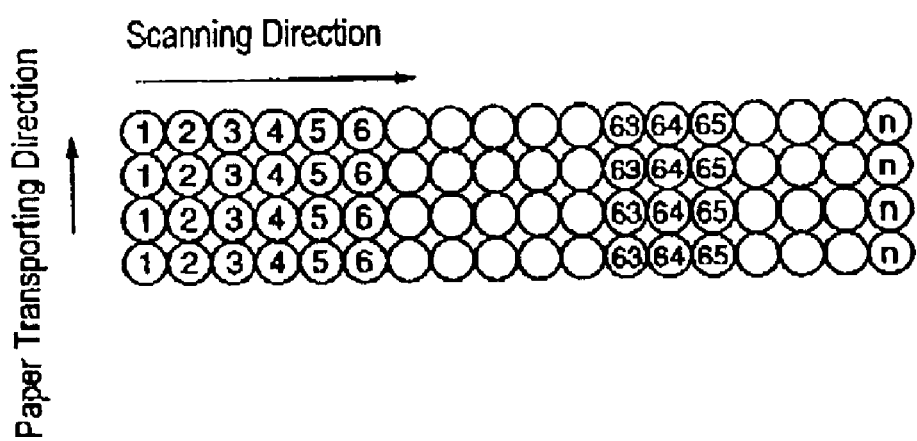
Figure 19:
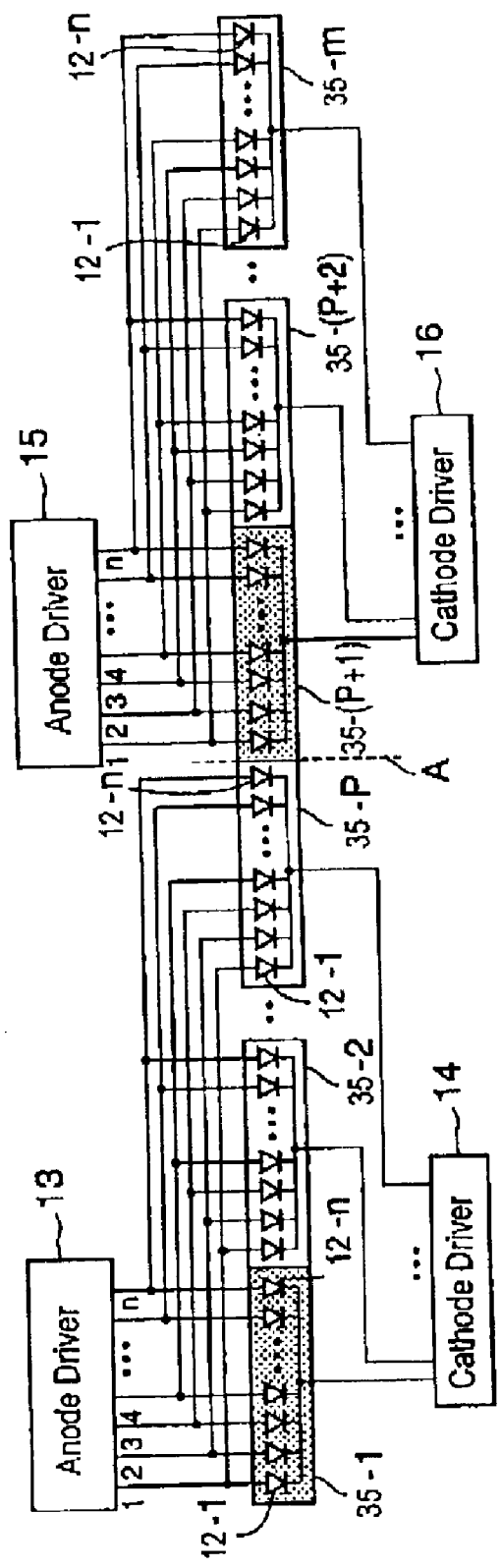
Figure 20:
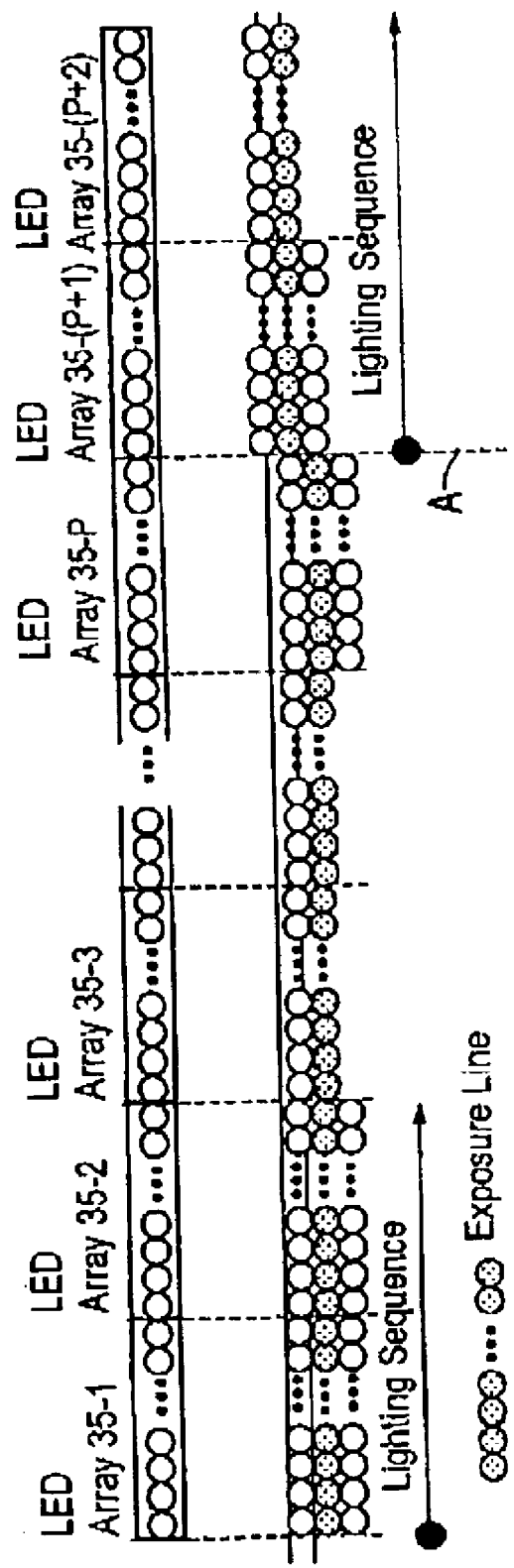
FIG. 20 is a schematic drawing showing an order of lighting in a conventional image forming apparatus using arrayed LEDs shown in FIG. 19.
Figure 21:
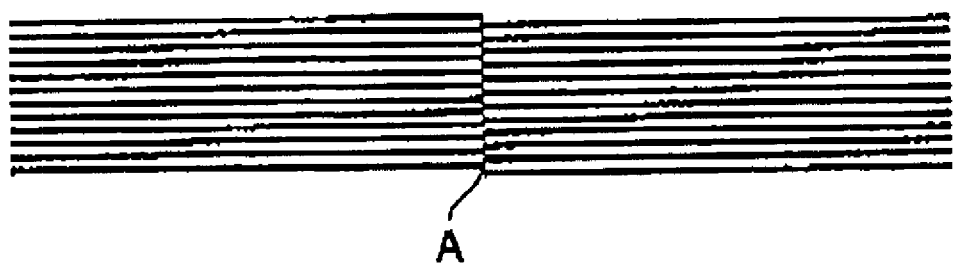
FIG. 21 is a schematic drawing showing a stepped deviance generated by exposure shown in FIG. 20.
Figure 22:
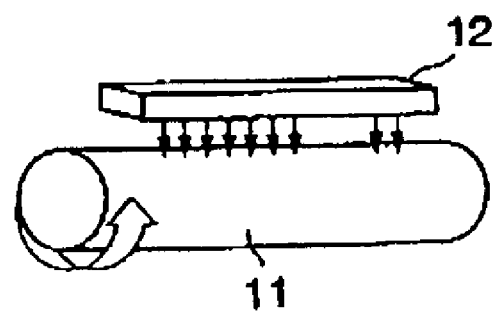
FIG. 22 is a schematic drawing showing a positional relation between an LED print head and a photosensitive body drum in a conventional image forming apparatus.
Figure 23:
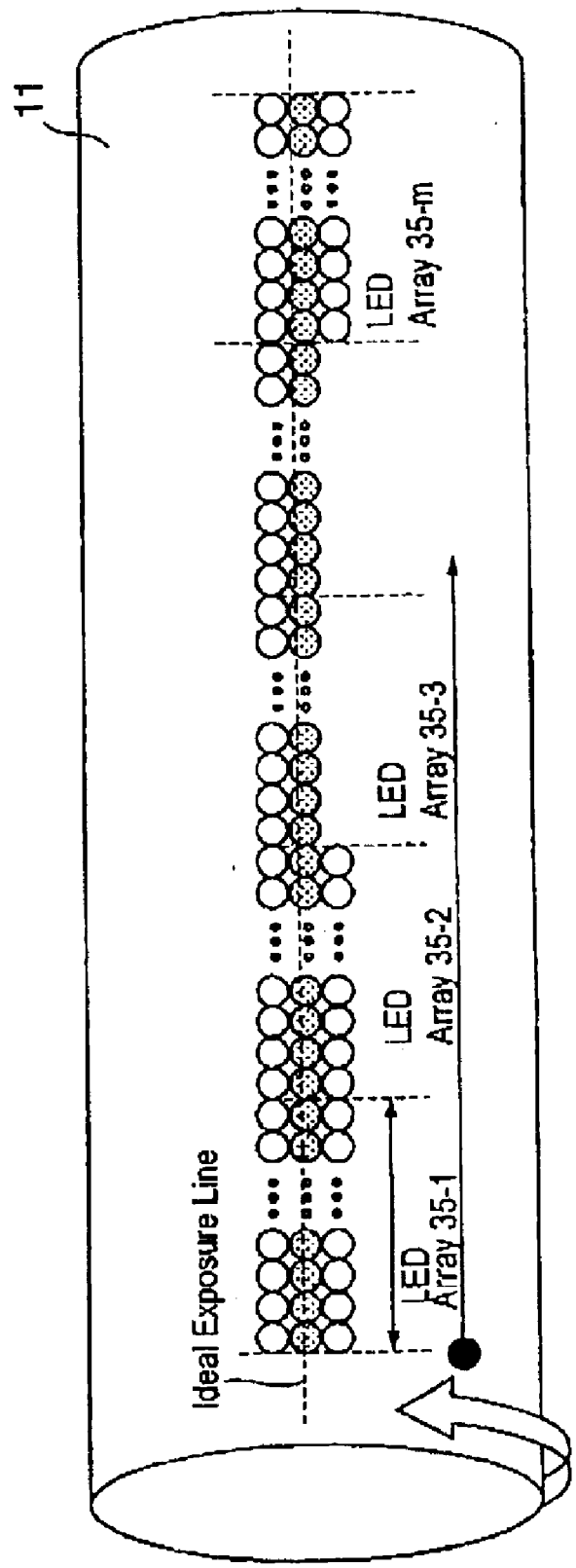
FIG. 23 is a schematic drawing showing exposed lines when controlling dynamically to light in a conventional image forming apparatus.

FIG. 14 to FIG. 19 are drawings illustrating a third embodiment of an image forming apparatus according to the present invention. Referring to FIG. 14, an image forming apparatus using an LED print head is explained. The LED printer shown in FIG. 14 has an image memory (Video Memory) 21, a buffer memory 22, a data rearranging circuit 23, a data delivery circuit 28 and an LED print head 25. The LED print head is, for example, such print head as shown in FIG. 19 whose constitution is the same as that of the previous embodiment. An image data (VDATA) is stored in the image memory 21 and communicated to the data rearranging circuit 23, which rearranges the data. The data is rearranged according to the sequence of dynamic lighting control. Referring to FIG. 15, a first group of arrayed LEDs is controlled to light in the direction of left-hand side from the dividing plane A (i.e. from the p'th arrayed LEDs 35-p). A second group of arrayed LEDs is controlled to light in the direction of right hand side from the dividing plane A (i.e. from the (p+1)'th arrayed LEDs 35-(p+1)). Hereinafter, the lighting control is referred to as reverse V type lighting control, i.e. a first lighting control. Hence, the data rearranging circuit 23 rearranges image data according to the reverse V type lighting control to generate a rearranged image data. More specifically, since lighting sequence is reversed as for the first~the p'th arrayed LEDs 35-1~35-p compared with the ordinary case, the data rearranging circuit 23 after storing image data to the buffer memory 22, rearranges image data according to the sequence of the first group to generate a rearranged image data.

The rearranged image data is communicated to the data delivery circuit 28, which supplies the rearranged image data to the LED print head 24 in accordance with a predetermined sequence. For example, since a laser scanner, which is an exposing device, scans a laser ray in the direction perpendicular to the paper transporting direction, the delivery sequence of image data is a sequence of 1, 2, 3, 4, ..., 63, 64, 65, ..., n (or reverse of this).

As stated above, when the rearranged image data is communicated to the LED print head which is controlled to light according to the reverse V type lighting control, lighting control is done from the p'th arrayed LEDs 35-p in the first group and from the (p+1)'th arrayed LEDs 35-(p+1) in the second group as shown in FIG. 15. As a result, a stepped deviance of exposure is not generated at the boundary plane A. In other words, because dynamic lighting control is done sequentially from the p'th arrayed LEDs 35-p in the first group, an image is exposed sloping down to the left at an arrayed LEDs unit with respect to the aligning direction of arrayed LEDs in consideration of printing speed of the photosensitive body drum. While, since dynamic lighting control is done sequentially from the (p+1)'th arrayed LEDs 35-(p+) in the second group, a stepped deviance of exposure is not generated at the boundary plane A.

Figure 17:
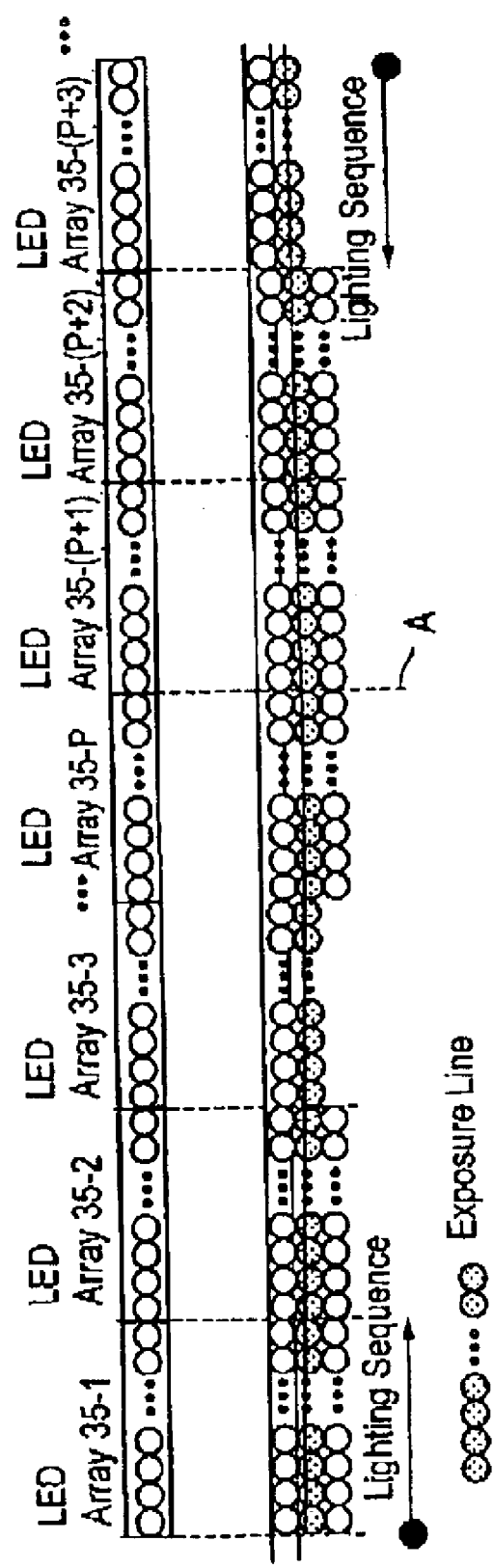
Figure 18:

Referring to FIG. 17, it is also applicable to control to light from the first arrayed LEDs 35-1 with respect to the boundary plane A in the first group and from the m'th arrayed LEDs 35-m in the second group (hereinafter referred to as V type lighting control, i.e. a first lighting control). Hence, the data rearranging circuit 23 rearranges image data according to the V type lighting control to generate a rearranged image data. More specifically, since lighting sequence is reversed as for the (p+1)'th~the m'th arrayed LEDs 35-(p+1)~35-m compared with the ordinary case, the data rearranging circuit 23 after storing image data to the buffer memory 22, rearranges image data according to the sequence of the second group to generate a rearranged image data.

As stated above, when the rearranged image data is communicated to the LED print head 24 which is controlled to light according to the V type lighting control, lighting control is done from the first arrayed LEDs 35-1 in the first group and from the m'th arrayed LEDs 35-m in the second group as shown in FIG. 17. As a result, a stepped deviance of exposure is not generated at the boundary plane A. In other words, because dynamic lighting control is done sequentially from the first arrayed LEDs 35-1 in the first group, an image is exposed sloping down to the right at an arrayed LEDs unit with respect to aligning direction of arrayed LEDs in consideration of printing speed of the photosensitive body drum. While, since dynamic lighting control is done sequentially from the m'th arrayed LEDs 35-m in the second group, a stepped deviance of exposure is not generated at the boundary plane A.

Thus, a plurality of arrayed LEDs aligned in the main scanning direction is divided into a plurality of groups. When each group is dynamically controlled to light according to the image data, lighting sequence in the individual group is defined and the image data are rearranged according to the sequence. Consequently, a stepped deviance of exposure is not generated at the boundary plane A, giving a good image.

Meanwhile, for resolving the aforementioned stepped deviance, the following method is also applicable.

Here, arrayed LEDs in the first group are controlled to light sequentially from the first arrayed LEDs 35-1 and arrayed LEDs in the second group are controlled to light sequentially from the (p+1)'th arrayed LEDs 35-(p+1). First, scanning number of times is increased to k times the scanning speed (the linear speed of the photosensitive body drum) and exposure is done by dividing a dot into k times. Namely, a dot on one line is divided into k dots in the auxiliary scanning direction so as to expose k dots. In this regard, image data of one precedent line is stored in the buffer memory 22 (FIG. 14) and is exposed according to the oblique correcting value. As a result, exposure by the first arrayed LEDs 35-1 is done by an exposing data of the current line so that a ratio of exposure by exposing data of the precedent line increases as the first arrayed LEDs 35-1 depart, which results in preventing oblique exposed line.

For example, when an oblique correcting value of the p'th arrayed LED 35-p needs to be found, a deviation amount δ (recorded point) is found for one arrayed LEDs on the ideal line first in advance.

The deviation amount δ is expressed as $\delta=1/m \times \eta$, where an exposing time ratio $\eta=T \times Tmax$. T is a data transferring time (s/line), Tmax is a maximum time for one line which is found from a linear speed S (s/line) and expressed as $Tmax=1/(1/S \times 25.4/D)$ where D is an imaging density (dpi).

Further, as for a deviation amount δ at the position of the p'th arrayed LEDs 35-p, the inequality, $\delta \times (M-1) > Q/q$, holds for a scanning density q and a scanning number of times Q. All image data of precedent lines are read regarding arrayed LEDs subsequent the arrayed LED which satisfies the inequality by finding the arrayed LEDs number. When the buffer memory circuit 22 is controlled to read, it is determined whether an image data of the precedent line is read or an image data of the current line is not read. Thus, when an image data is read from the buffer memory circuit 22, it is determined whether the image data of the precedent line is read or not depending on whether a select signal is 0 or 1. Likewise, correction is performed for the second group according to the aforementioned deviation amount δ.

Thus, when an exposing line is corrected in accordance with a deviation amount δ, the p'th arrayed LEDs 35-p exposes an image data of the precedent line and the (p+1)'th arrayed LEDs 35-(p+1) exposes an image data of the current line so as to avoid the stepped deviance generating at the boundary plane A between the first and the second group.

As explained above, according to the present embodiment, when a plurality of arrayed illuminants aligned in the main scanning direction are divided into a plurality of groups and exposure is performed to form an image on the image bearing body which is moving in auxiliary scanning direction at a predetermined scanning speed by controlling dynamically to light the arrayed illuminants for each group, image data are rearranged in accordance with a predetermined lighting sequence for an individual group on the basis of the boundary plane A and the arrayed illuminants are controlled to light according to the rearranged image data, that is, the arrayed illuminants are sequentially lighted from the arrayed illuminants nearest to the boundary plane or from the arrayed illuminants farthest to the boundary plane so that the present embodiment has an effect of avoiding a stepped deviance of drawing generating at the boundary plane to give a good image.

Further, according to the present embodiment, when a plurality of arrayed illuminants aligned in the main scanning direction are divided into a plurality of groups and exposure is performed to form an image on the image bearing body which is moving in auxiliary scanning direction at a predetermined scanning speed by controlling dynamically to light the arrayed illuminants for each group, an exposing data is selected from an image data of the one precedent line or an image data of the current line and the arrayed illuminants is controlled dynamically to light in accordance with the exposing data so that the present embodiment has an effect of avoiding a stepped deviance of drawing generating at the boundary plane to give a good image.

What is claimed is:

1. An image forming apparatus comprising an exposing head having sets of arrayed illuminants aligned along a main scanning direction, the sets of arrayed illuminants being dynamically controlled to light so as to expose an image bearing body which moves in an auxiliary scanning direction at a predetermined speed for forming an image; and a control means for lighting which dynamically controls to light the sets of arrayed illuminants according to an exposing data selected from an image data of a precedent line or from an image data of a current line based on a predetermined correcting value, wherein the control means for lighting comprises a circuit for rearranging data that rearranges image data read from a reading line buffer so as to reverse data array among adjacent sets of arrayed illuminants and communicate the rearranged image data to the exposing head and a circuit for controlling arrayed illuminants that dynamically controls to light the exposing head in accordance with the rearranged image data.

2. An image forming apparatus according to claim 1, wherein when the first set to the m'th set of arrayed illuminants are dynamically controlled to light with this sequence, the control means for lighting determines whether the M'th (M is an integer equal to or greater than 1 and equal to or less than m) set of arrayed illuminants shall be dynamically controlled to light using an image data of the precedent line or an image data of a current line, based on a select signal generated in accordance with a deviance amount between an actual exposing line of the arrayed illuminants and an ideal exposing line, a scanning density or a scanning number of times.

3. An image forming apparatus according to claim 2, wherein the control means for lighting dynamically controls to light a set of arrayed LEDs behind the M'th set of arrayed illuminants in a main scanning direction using an image data of the one precedent line when the M'th set of arrayed illuminants is dynamically controlled to light using an image data of one preceding line.

4. An image forming apparatus according to claim 2, wherein the control means for lighting comprises a first a third line buffer memories on which an image data for one line is written and a memory control circuit that controls to write an image data for one line to the writing line buffer memory as a line buffer memory by selectively writing the first the third line buffer memories while controlling to read an image data for one line from the reading line buffer memory as a line buffer by reading one of other line buffer memories based on the select signal.

5. An image forming apparatus wherein a plurality of the exposing heads defined in claim 1, are aligned and each of the heads is dynamically controlled to light by the control means for lighting defined in claim 1.

6. An image forming apparatus according to claim 1, wherein the circuit for controlling arrayed illuminants dynamically controls to light the arrayed illuminants in accordance with a clock signal having a frequency k (K>1) times the scanning speed.

7. An image forming apparatus according to claim 1, wherein when the image forming apparatus has an exposing head having a plurality of arrayed illuminants aligned in the main scanning direction and divided into a plurality of groups and an image is formed on an image bearing body moving in the auxiliary direction at a predetermined scanning speed by controlling dynamically to light the arrayed illuminants for each group in accordance with a predetermined correcting value, the image forming apparatus further comprises an lighting control means in which an exposing data is selected from an image data of the one precedent line or an image data of the current line and the arrayed illuminants is controlled dynamically to light in accordance with the exposing data.

8. An image forming apparatus according to claim 7, wherein the image forming apparatus further comprises a lighting control means which controls to light arrayed illuminants according to a rearranged image data which is rearranged by a predetermined lighting sequence based on the boundary plane between the groups.

9. An image forming apparatus according to claim 8, wherein the predetermined lighting sequence is the sequence defined in such a manner that arrayed illuminants are lighted from the nearest to the boundary plane.

10. An image forming apparatus according to claim 8, wherein the predetermined lighting sequence is the sequence defined in such a manner that arrayed illuminants are lighted from the furthest to the boundary plane.

11. An image forming apparatus comprising a position detecting means which generates a position detecting signal by detecting a deviation from a predetermined standard fixing position of an exposing head, the position detecting means having odd number of at least three CCD elements for detecting a position aligned along the auxiliary scanning direction; and a control means for lighting which controls dynamically to light arrayed illuminants in accordance with an exposing data selected from the image data from an (k−1)-line-precedent image data to a current image data (k is an integer greater than 1) based on a correcting value which is set in compliance with a deviation denoted by the position detecting signal, wherein the control means for lighting comprises a circuit for rearranging data that rearranges image data read from a reading line buffer so as to reverse data array among adjacent sets of arrayed illuminants and communicate the rearranged image data to the exposing head and a circuit for controlling arrayed illuminants that dynamically controls to light the exposing head in accordance with the rearranged image data.

12. An image forming apparatus according to claim 11, wherein the exposing head is provided with a first to m'th set (m is an integer greater than one) of arrayed illuminants together with a light emitting element and when controlling dynamically to light the sets of arrayed illuminants in a sequential order of the first to the m'th set, the position detecting means detects a deviation from the standard fixing position in accordance with an exposing data selected from the image data from an (k−1)-line-precedent image data to a current image data based on a deviance amount between an actual exposing line of the M'th set of arrayed illuminants which is selected by the position detecting signal.

13. An image forming apparatus according to claim 11, wherein the position detecting means has a plurality of light accepting elements and detects a deviation from the standard fixing position according to a deviation between the distribution of received light of a light accepting element as a standard light accepting element and the predetermined distribution of received light.

14. An image forming apparatus according to claim 11, wherein the control means for lighting has a first to a K'th line buffer memories to each of which a line of an image data is written and a memory control circuit which controls to light according to a line of an image data which is read from a line buffer memory selected from other line buffer memories based on the position detecting signal while a line of an image data is written to a line buffer memory selected from the first to the K'th line buffer memories.

15. An image forming apparatus according to claim 11, further comprising a position detecting means for detecting a deviation from a standard fixing position predetermined for each exposing head and for generating a position detecting signal and a control means for lighting arrayed illuminants of each exposing head in accordance with a exposing data which is an image data selected from the image data from an (k−1)-line-precedent image data to a current image data (k is an integer greater than 1) based on a correcting value which is set in compliance with a deviation denoted by the position detecting signal.

* * * * *